(12) United States Patent
Metz et al.

(10) Patent No.: US 12,246,853 B2
(45) Date of Patent: Mar. 11, 2025

(54) SYSTEM AND PROCESS FOR CLEANING A JET ENGINE COMPONENT

(71) Applicant: CANYON RUN ENGINEERING TECHNOLGIES, Troy, OH (US)

(72) Inventors: Marc Alan Metz, Enon, OH (US); Gary Lee Ward, Pleasant Hill, OH (US); Thomas Lawrence Clutter, Tipp City, OH (US)

(73) Assignee: Canyon Run Engineering Technologies, Troy, OH (US)

( * ) Notice: Subject to any disclaimer, the term of this patent is extended or adjusted under 35 U.S.C. 154(b) by 0 days.

(21) Appl. No.: 18/358,417

(22) Filed: Jul. 25, 2023

(65) Prior Publication Data

US 2023/0373657 A1 Nov. 23, 2023

Related U.S. Application Data

(63) Continuation of application No. 17/584,690, filed on Jan. 26, 2022, now Pat. No. 11,845,568.

(51) Int. Cl.
*B64F 5/30* (2017.01)
*B08B 1/14* (2024.01)
*B08B 1/32* (2024.01)

(52) U.S. Cl.
CPC .............. *B64F 5/30* (2017.01); *B08B 1/143* (2024.01); *B08B 1/32* (2024.01)

(58) Field of Classification Search
None
See application file for complete search history.

(56) References Cited

U.S. PATENT DOCUMENTS 8,984,696 B2 * 3/2015 Stuchlik ................ A47L 11/283
15/340.1

FOREIGN PATENT DOCUMENTS

DE 102017218425 4/2019

* cited by examiner

*Primary Examiner* — Eric W Golightly
(74) *Attorney, Agent, or Firm* — Jacox, Meckstroth & Jenkins

(57) ABSTRACT

A turbine engine cleaner assembly comprising: at least one drive block coupled to a driver for rotatably driving said at least one drive block, said at least one drive block comprising at least one passageway having an inlet and an outlet, said inlet coupled to a pneumatic supply; and a wiper comprising at least one paddle, said at least one paddle having at least one inflatable bag detachably mounted thereto, said at least one paddle adapted to be detachably mounted to said at least one drive block so that when air is received in said inlet, it passes into and through said at least one passageway and said outlet to inflate said at least one inflatable bag, said at least one drive block rotatably driving said at least one paddle so that said at least one paddle is rotatably driven.

16 Claims, 23 Drawing Sheets
(8 of 23 Drawing Sheet(s) Filed in Color)

Surfaces 12a - may be spaced, interior, generally parallel, non-parallel, radial, perpendicular, arcuate, interrupted, polygonal or the like

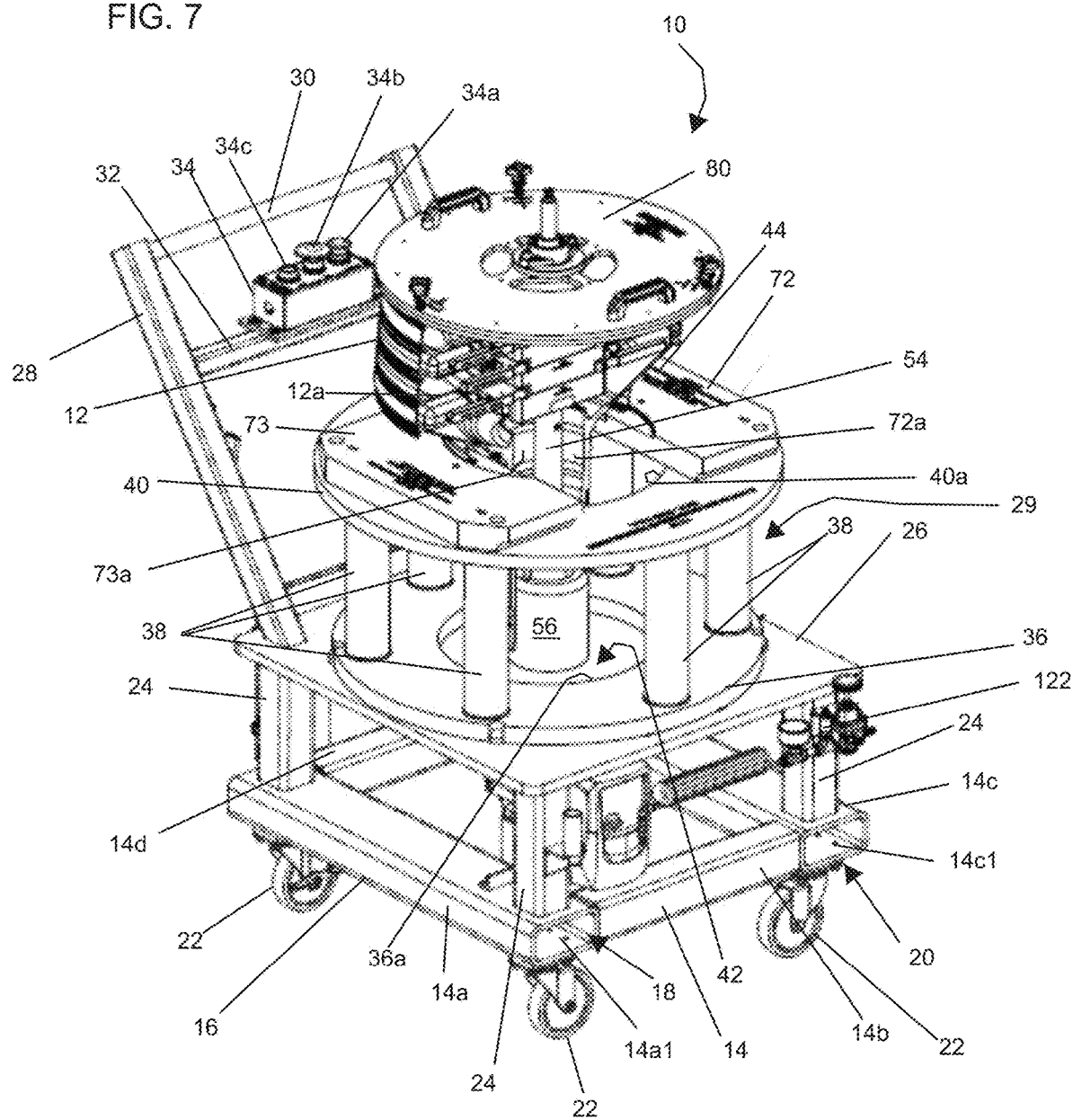

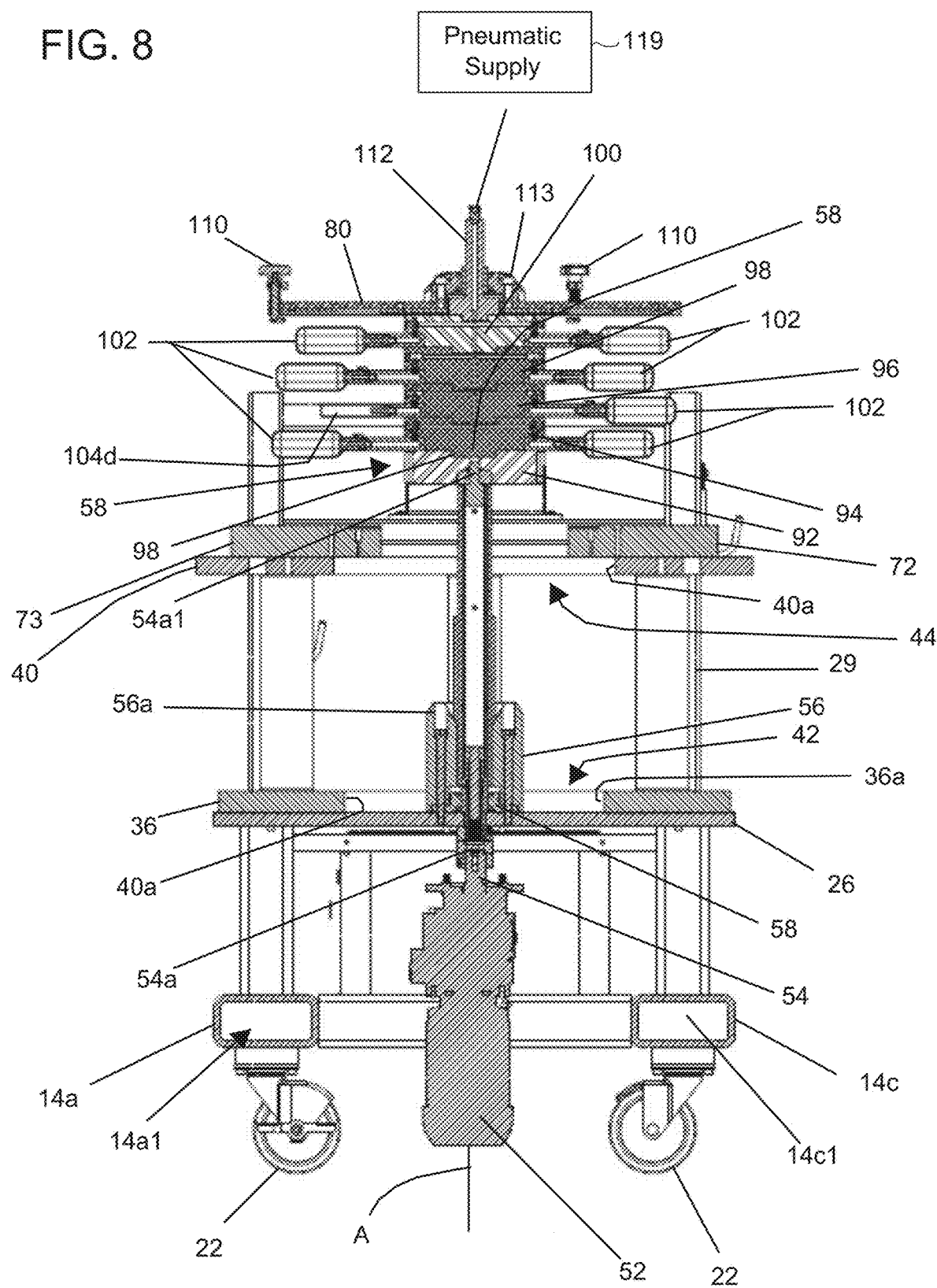

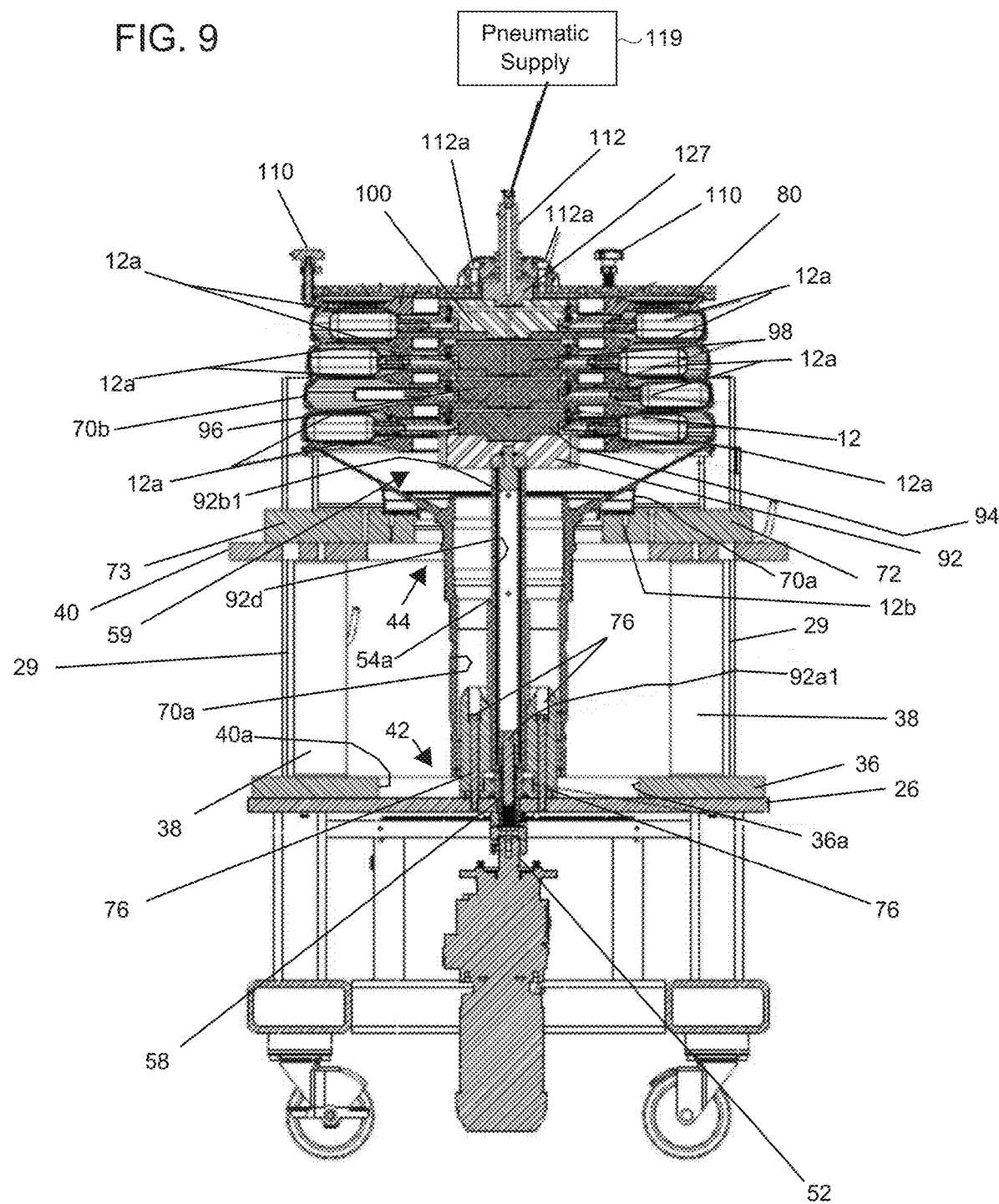

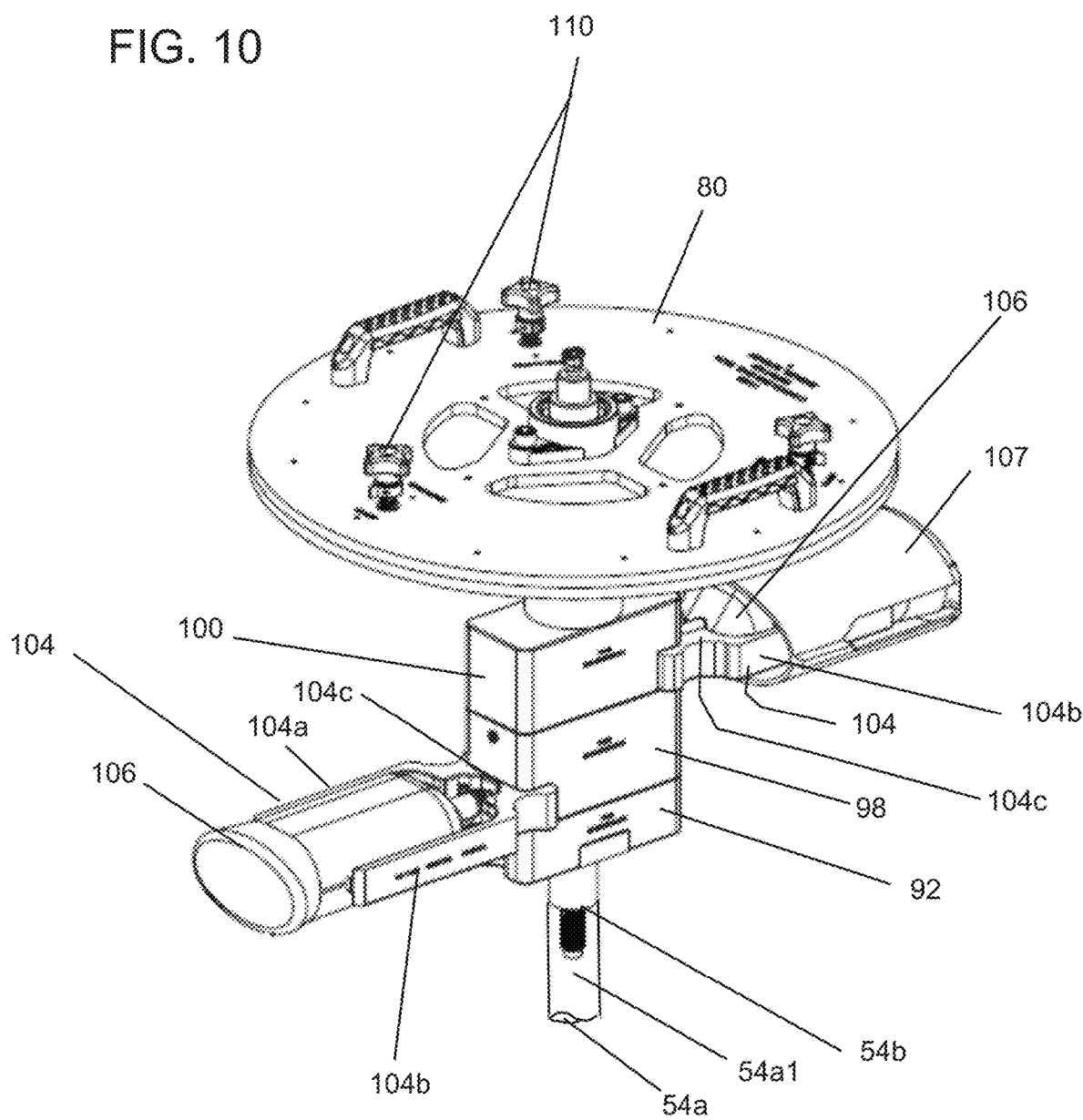

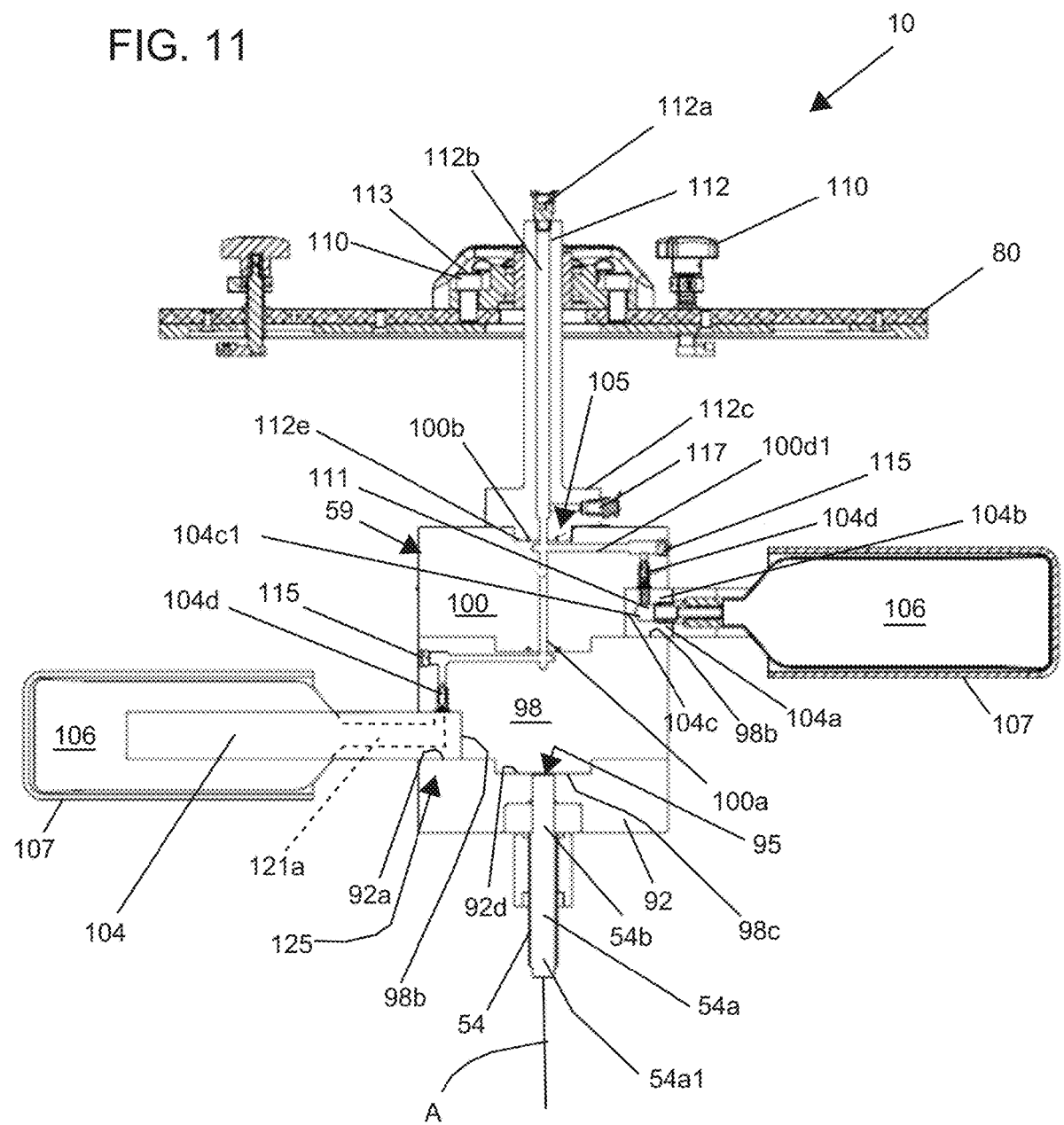

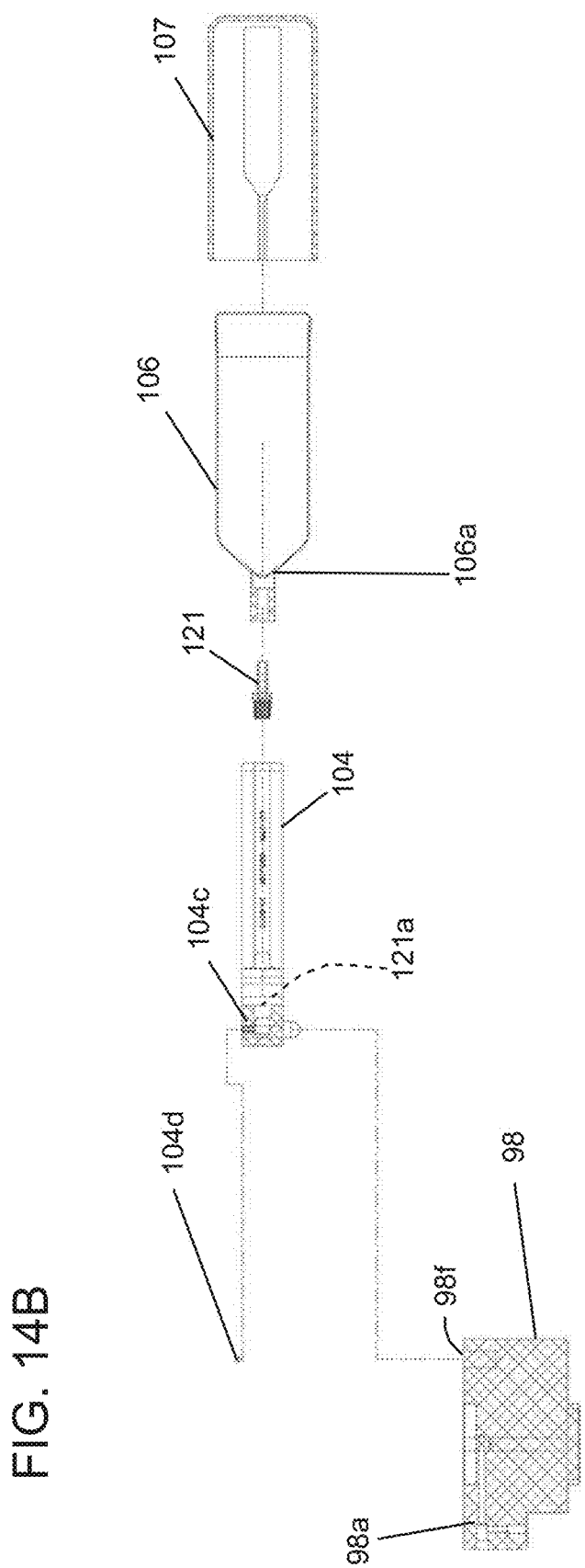

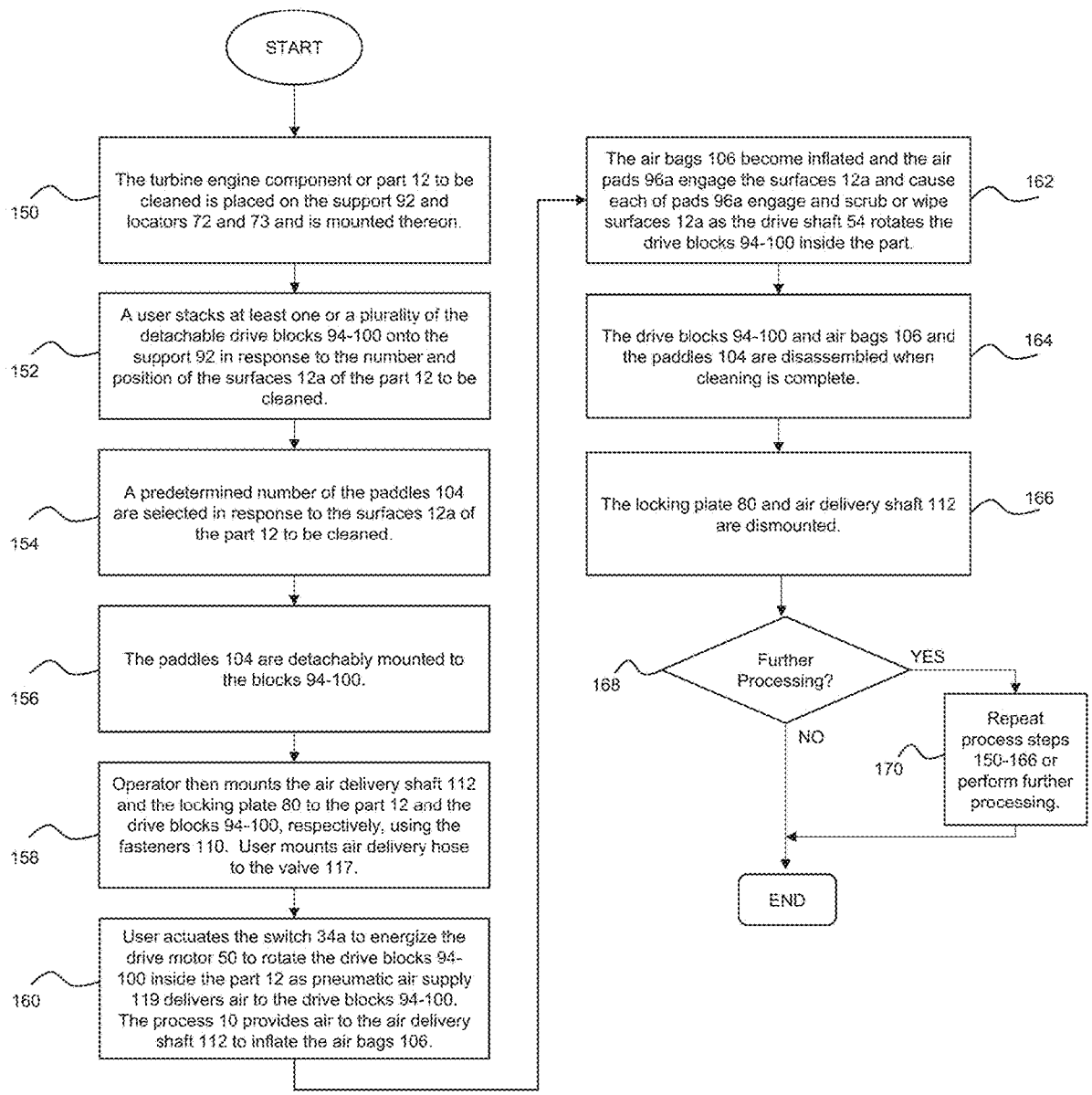

SYSTEM AND PROCESS FOR CLEANING A JET ENGINE COMPONENT

CROSS-REFERENCE TO RELATED APPLICATIONS

The present application is a continuation of U.S. application Ser. No. 17/584,690, filed Jan. 26, 2022, and issued as U.S. Pat. No. 11,845,568 on Dec. 19, 2023. This application is incorporated herein by reference and made a part hereof.

BACKGROUND OF THE INVENTION

1. Field of the Invention

This invention relates to a system and process for cleaning a jet engine component and, more particularly, a system and process for cleaning the inside surfaces of a jet engine component.

2. Description of the Related Art

In the field of aviation, the use of jet engines is well-known. Jet engines typically comprise many components, such as a turbine spools or disks, that periodically need to be cleaned and polished and their surfaces inspected for defects. The turbine engine components are typically disassembled and then hand cleaned so that any residual contamination inside the components can be removed. Unfortunately, many of the surfaces inside the components are difficult for a person to reach or see for inspection.

Oftentimes, these areas are very narrow, and sometimes too narrow, to get a human hand in to polish the contaminated surfaces. To date, the industry has used paint stir sticks with abrasive pads glued to the ends to polish the surfaces. Unfortunately, the effectiveness of the prior art approaches was not dependable and was oftentimes inaccurate because the person performing the cleaning cannot see in the areas and the surfaces that need to be cleaned.

Another problem with the prior art approaches to cleaning the inside of the surfaces was the time it took to do so. In the past, it would typically take four to five hours to clean a single part manually.

What is needed therefore is a system and method of cleaning, scrubbing and polishing the inside of a part, particularly where the areas of the surfaces to be cleaned are narrow.

SUMMARY OF THE INVENTION

One object of the invention is to provide a system and method for scrubbing and/or polishing the inside of a turbine engine component.

Another object of the invention is to provide a system and method that utilizes a plurality of stackable drive blocks having at least one or a plurality of inflatable air bags that can be inflated to clean the component.

Another object of the invention is to provide a system and method that utilize a plurality of rotatable drive blocks having a plurality of cleaning assemblies that are adapted to receive a pad, scrubber, sock, cover or bag that engages at least one or a plurality of surfaces of the part to be cleaned.

Still another object of the invention is to provide a system and method that are adapted for cleaning a part having surfaces, which may be spaced, interior, generally parallel, non-parallel, radial, perpendicular, arcuate, interrupted, polygonal or the like.

Another object of the invention is to provide a plurality of stackable drive blocks, each of which having at least one conduit for delivering fluid, such as air, to at least one or a plurality of paddles that are coupled to the drive block and that have an air bag that becomes in fluid communication with the at least one conduit in the drive block so that it can be inflated.

Another object of the invention is to provide means and a system for causing a plurality of inflatable air bags to be properly positioned relative to surfaces to be cleaned and polished in a part with each assembly having at least one bag that can be inflated so that the pad, scrubber, sock, cover, or abrasive pad that covers the bag can engage the surface or surfaces to be cleaned and so that the plurality of assemblies can be rotated inside the part in order to clean the surfaces.

Yet another object of the invention is to provide a system and method for cleaning the surfaces of the turbine engine component wherein the method and system can perform the cleaning and polishing process in less than a predetermined time, such as ten minutes.

Another object of the invention is to provide a system and method that utilize a plurality of stackable and detachable drive blocks having at least one or a plurality of fluid passageways that cooperate to become in fluid communication when the plurality of drive blocks are stacked.

Another object of the invention is to provide a system and method that are adapted to cause a plurality of cleaning pads to be properly positioned in a predetermined relationship relative to the surfaces to be cleaned inside the part.

Another object of the invention is to provide a system and method that utilize a cleaning assembly that comprises a plurality of cleaning paddles, each of which having a cleaning pad thereon, and wherein the plurality of cleaning paddles are adapted to be detachably mounted to a manifold that is adapted to deliver air to each of the paddles.

Another object of the invention is to provide a manifold assembly that is comprised of a plurality of drive blocks that are selectively stacked on top of each other to provide the manifold assembly.

Another object of the invention is to provide a system and method that is adapted to clean a turbine engine component, such as a turbine engine component surface with a scrubbing pressure of about 2-3 PSI.

Another object of the invention is to provide a system and method that provide a plurality of paddles having air bags that rotate scrubbers at about 15-20 rpms. In one illustrative embodiment, the system scrubs at about 17 rpms in order to clean the surfaces of the part to be cleaned.

Another object of the invention is to provide an additional pad, scrubber, sock, cover or bag that has added strips along the distal edge of the bag to reach areas where the air bag is not able to pneumatically push a traditional bag or bag of the type shown and described herein. The bag with strips facilitates scrubbing areas such as radii and corners. Note that the strips can be detachably secured, permanently secured or integrally formed with the bag so that these strips may be attached to the bag where necessary or desired.

Yet another object of the invention is to provide a hinged paddle. This hinged paddle comprises a hinge that pivots to allow insertion into the tight spaces of the engine component, for example, by bending around a tight corner. Once inside the component, it is pivoted back to its original straight or planar configuration and acts like a normal paddle depicted in other embodiments.

In one aspect, one embodiment of the invention comprises a turbine engine component cleaning system for cleaning at least one turbine engine component, the turbine engine component cleaning system comprising a frame having a turbine engine component support surface for supporting the at least one turbine engine component; a drive motor mounted on the frame and having a driver; at least one cleaner assembly coupled to the driver and adapted to rotate in response to the drive motor being energized, the at least one cleaner assembly having at least one cleaning area; wherein the at least one turbine engine component has at least one surface to be cleaned, the at least one cleaner being adapted to be removeably mounted on the driver and after being mounted thereon, the at least one cleaner becomes positioned in operative relationship with the at least one surface to be cleaned so that when the drive motor is energized, the at least one cleaner rotates and wipes, scrubs and/or polishes the at least one surface to be cleaned.

In another aspect, another embodiment of the invention comprises a turbine engine component cleaning system for cleaning at least one turbine engine component, the at least turbine engine component having a at least one or a plurality of surfaces to be cleaned, the turbine engine component cleaning system comprising a frame having a turbine engine component support surface for supporting the at least one turbine engine component; a drive motor mounted on the frame and having a driver; and at least one cleaner assembly adapted to be rotatably driven by the driver in response to the drive motor being energized, the at least one cleaner assembly comprising at least one paddle having at least one inflatable air bag; the at least one inflatable air bag having at least one cleaning area that becomes situated in operative relationship with at least one of the plurality of surfaces so that when the drive motor is energized, the driver rotatably drives the at least one inflatable air bag, thereby cleaning at least one of the surfaces.

In another aspect, another embodiment of the invention comprises a turbine engine component cleaning system for cleaning a turbine engine component having a plurality of surfaces to be cleaned, the turbine engine component cleaning system comprising a frame having a drive motor mounted thereon, the frame having a turbine engine component support area for supporting the turbine engine component; a drive motor having a drive shaft; a drive mount mounted on the drive shaft and rotatably driven when the drive motor is energized; a plurality of stackable drive blocks adapted to be selectively stacked and mounted onto the drive mount; a plurality of cleaner assemblies selectively and detachably coupled to the plurality of stackable drive blocks, respectively, each of the plurality of cleaner assemblies comprising at least one paddle detachably coupled to at least one of the plurality of stackable drive blocks; at least one inflatable air bag coupled to the at least one paddle; wherein the at least one inflatable air bag is adapted to inflate and rotate about an axis of the drive shaft when the drive motor is energized in order to wipe, scrub and/or polish at least one of the plurality of surfaces to be cleaned after the at least one paddle is detachably mounted to the at least one of the plurality of stackable drive blocks.

Another aspect of this invention is a method for cleaning a turbine engine component having a plurality of surfaces to be cleaned, the method comprising the steps of placing the turbine engine component on a turbine engine component support; stacking a predetermined number of blocks onto a drive block support that is mounted on a drive shaft coupled to a drive motor; situating a predetermined number of paddles on the predetermined number of blocks; respectively, each of the predetermined number of paddles being positioned in operative relationship with at least one of the plurality of surfaces to be cleaned, each of the predetermined number of paddles having an inflatable air bag coupled thereto; inflating each of the inflatable air bags; and energizing a drive motor to rotatably drive the drive block support, thereby causing the inflatable air bag to wipe, scrub and/or polish the at least one of the plurality of surfaces to be cleaned.

This invention, including all embodiments shown and described herein, could be used alone or together and/or in combination with one or more of the features covered by one or more of the following list of features:

The turbine engine component cleaning system wherein the at least one cleaner assembly comprises a wiper comprising the at least one cleaning area.

The turbine engine component cleaning system wherein the wiper comprises an inflatable bag adapted to be inflated to facilitate an engagement between the at least one cleaning area and the at least one surface to be cleaned so that when the drive motor is energized, the driver rotatably drives the wiper to wipe, scrub and/or polish the at least one surface to be cleaned.

The turbine engine component cleaning system wherein the at least one cleaner assembly comprises at least one drive block coupled to the driver, the at least one drive block comprising at least one pneumatic passageway having an inlet coupled to a pneumatic supply and an outlet; wherein the wiper comprises at least one paddle, the at least one paddle having the inflatable bag detachably thereto, the at least one paddle adapted to be detachably mounted on the at least one block so that when air is received in the inlet, it passes into and through the at least one pneumatic passageway and the outlet to inflate the inflatable bag so that it engages the at least one surface to be cleaned when the drive motor is energized, the at least one paddle is rotatably driven and the at least one cleaning area wipes, scrubs and/or polishes the at least one surface to be cleaned.

The turbine engine component cleaning system wherein the at least one cleaner assembly comprises a wiper and the at least one turbine engine component to be cleaned comprises a first surface and a second surface that is generally parallel to and opposes the first surface, the at least one cleaning area of the at least one cleaner comprising at least one first cleaning area and at least one second cleaning area, the at least one first and second cleaning areas substantially simultaneously engaging the first surface and the second surface, respectively, so that when the driver rotatably drives the wiper, the first and second at least one cleaning areas of the wiper simultaneously rotate to wipe, scrub and/or polish the first and second at least one cleaning areas, respectively.

The turbine engine component cleaning system wherein the wiper comprises an inflatable bag comprising the at least one first and second cleaning areas.

The turbine engine component cleaning system wherein the inflatable bag is adapted to be inflated to increase a cross-sectional dimension to facilitate an engagement between the at least one first cleaning area and the first surface and the at least one second cleaning area and the second surface so that when the drive motor is energized, the inflatable bag is rotated to substantially simultaneously wipe, scrub and/or polish the first and second surfaces to be cleaned.

The turbine engine component cleaning system wherein the at least one cleaner assembly comprises at least one drive block coupled to the driver, the at least one drive block comprising at least one pneumatic passageway having an inlet coupled to a pneumatic supply and an outlet; wherein the at least one cleaner assembly comprises at least one paddle, the at least one paddle having an inflatable bag detachably mounted thereto, the at least one paddle adapted to be mounted on the at least one block so that when air is received in the inlet, it passes into and through the at least one pneumatic passageway and the outlet to inflate the inflatable bag so that when the drive motor drives the driver, the at least one cleaning area wipes, scrubs and/or polishes the at least one surface to be cleaned.

The turbine engine component cleaning system wherein the turbine engine component cleaning system comprises a pneumatic control for controlling the pneumatic supply, the pneumatic control being adapted to vary a supply of air to the inflatable bag in order to change a dimension of the inflatable bag in order to vary a pressure of the at least one first and second cleaning areas to wipe, scrub and/or polish the at least one surface to be cleaned.

The turbine engine component cleaning system wherein the at least one cleaner comprises at least one support block coupled to the drive and a plurality of cleaners, each of the plurality of cleaners having at least one paddle having a wiper and being detachably mounted onto at least one of either drive or another of the plurality of cleaners so that the wipers become positioned in operative relationship and engage the at least one first and second surfaces to be cleaned so that when the driver is energized, the plurality of cleaners wipe, scrub and/or polish the plurality of surfaces to be cleaned, respectively.

The turbine engine component cleaning system wherein each of the wipers comprises an inflatable bag comprising at least one first cleaning area and at least one second cleaning area.

The turbine engine component cleaning system wherein the inflatable bag is adapted to be inflated to increase a cross-sectional dimension of the inflatable bag to facilitate an engagement between the at least one first cleaning area and the first surface and the at least one second cleaning area and the second surface so that when the drive motor is energized, the inflatable bag is rotated to substantially simultaneously wipe, scrub and/or polish the first and second surfaces to be cleaned.

The turbine engine component cleaning system wherein the first and second surfaces are generally planar and spaced a predetermined distance from each other; the cross-sectional dimension of the inflatable bag being less than the predetermined distance when not inflated and a being equal to or greater than the predetermined distance when inflated so that the at least one first cleaning area engages the first surface and the at least one second cleaning area engages the second surface so that when the drive motor is energized, the inflatable bag is rotated to substantially simultaneously wipe, scrub and/or polish the first and second surfaces to be cleaned.

The turbine engine component cleaning system wherein the at least one cleaner assembly comprises at least one drive block coupled to the driver, the at least one drive block comprising at least one pneumatic passageway having an inlet coupled to a pneumatic supply and an outlet; wherein the at least one cleaner assembly comprises at least one paddle, the at least one paddle having the inflatable bag detachably mounted thereto, the at least one paddle adapted to be mounted on the at least one block so that when air is received in the inlet, it passes into and through the at least one pneumatic passageway and the outlet to inflate the inflatable bag.

The turbine engine component cleaning system wherein the at least one paddle has a hinge and can pivot about a predetermined axis.

The turbine engine component cleaning system wherein at least one inflatable air bag comprises at least one of integrally formed strips or wipers or detachable strips or wipers that are detachably secured, permanently secured or integrally formed with the at least one inflatable air bag in a predetermined position.

The turbine engine component cleaning system wherein the first and second surfaces to be cleaned are spaced, interior, generally parallel, non-parallel, radial, perpendicular, arcuate, interrupted, polygonal or the like.

The turbine engine component cleaning system wherein the first and second surfaces to be cleaned are generally parallel and generally planar.

The turbine engine component cleaning system wherein the at least one surface to be cleaned is spaced from another surface to be cleaned, interior to the at least one turbine engine component, generally parallel to another surface to be cleaned, non-parallel to another surface to be cleaned, radial, perpendicular, arcuate, interrupted, polygonal or the like.

The turbine engine component cleaning system wherein the at least one paddle is detachably mounted to the driver and is adapted to be situated between two of the plurality of surfaces to be cleaned, the at least one inflatable air bag comprises a plurality of cleaning areas, at least two of which substantially simultaneously cleans the two of the plurality of surfaces when the motor is energized and the at least one paddle rotates in response thereto.

The turbine engine component cleaning system wherein the at least one inflatable air bag is adapted to change at least one dimension upon inflation to facilitate an engagement between the plurality of cleaning areas and the plurality of surfaces.

The turbine engine component cleaning system wherein the at least one inflatable air bag changes the at least one dimension upon inflation from a non-engagement state when the at least one inflatable air bag does not engage the plurality of surfaces to an engagement state where the plurality of cleaning areas engage the plurality of surfaces.

The turbine engine component cleaning system wherein the driver comprises at least one block for detachably receiving and being coupled to the at least one paddle and the turbine engine component cleaning system further comprises a pneumatic supply for supplying air to the at least one inflatable air bag; the at least one paddle having a paddle passageway and the at least one block having a block passageway; the paddle passageway and the block passageway being in fluid communication when the at least one paddle is detachably mounted to the at least one block so that when the pneumatic supply is energized, the inflatable bag is inflated.

The turbine engine component cleaning system wherein the turbine engine component cleaning system comprises a plurality of support blocks; a plurality of paddles adapted to be detachably mounted to the plurality of support blocks, respectively, each of the plurality of paddles having an inflatable bag detachably mounted thereto; and a pneumatic inflation system for inflating the inflatable bag, the inflatable bag engaging and cleaning at least one of the plurality of surfaces to be cleaned; each of the plurality of paddles having a paddle passageway and each of the plurality of blocks having a block passageway, the paddle passageway and the block passageway being in fluid communication when at least one of the plurality of paddles is detachably secured to at least one of the plurality of blocks so that when the pneumatic inflation system is energized, the inflatable bag is inflated.

The turbine engine component cleaning system wherein the turbine engine component cleaning system comprises a plurality of paddles, each of the plurality of paddles having at least one inflatable bag adapted for simultaneously engaging the plurality of surfaces to be cleaned so that when the drive motor is energized, the driver rotatably drives all of the plurality of paddles, thereby cleaning the plurality of surfaces to be cleaned.

The turbine engine component cleaning system wherein the turbine engine component cleaning system further comprises a pneumatic supply; each of the plurality of paddles having at least one paddle conduit that becomes in fluid communication with the pneumatic supply when the plurality of paddles are selectively and detachably mounted to either the drive; and a coupler for coupling to the inflatable bag so that the at least one conduit may deliver air from the pneumatic supply to the at least one inflatable bag; wherein when the plurality of paddles are situated in operative relationship with the plurality of surfaces to be cleaned, the pneumatic supply is energized to inflate the inflatable bag, each of the plurality of paddles rotates and the inflatable bag on each of the plurality of paddles wipes, scrubs and/or polishes the plurality of surfaces, respectively, to be cleaned.

The turbine engine component cleaning system wherein the at least one paddle has a hinge and can pivot about a predetermined axis.

The turbine engine component cleaning system wherein the at least one inflatable air bag comprises at least one of integrally formed strips or wipers or detachable strips or wipers that are detachably secured, permanently secured or integrally formed with the at least one inflatable air bag in a predetermined position.

The turbine engine component cleaning system wherein the plurality of surfaces to be cleaned are spaced, interior, generally parallel, non-parallel, radial, perpendicular, arcuate, interrupted, polygonal or the like.

The turbine engine component cleaning system wherein the plurality of surfaces to be cleaned are generally parallel and generally planar.

The turbine engine component cleaning system wherein at least one of the plurality of surfaces to be cleaned is spaced from another surface to be cleaned, interior to the at least one turbine engine component, generally parallel to another surface to be cleaned, non-parallel to another surface to be cleaned, radial, perpendicular, arcuate, interrupted, polygonal or the like.

The turbine engine component cleaning system wherein each of the plurality of stackable drive blocks has a block conduit or passageway and each of the at least one paddles comprises at least one paddle conduit or passageway that becomes in fluid communication with the block conduit or passageway when the at least one paddle is detachably mounted to the at least one of the plurality of stackable drive blocks, the turbine engine component cleaning system further comprising a pneumatic air supply coupled to at least one of the plurality of stackable drive blocks; wherein each block conduit or passageway becomes in fluid communication with the at least one paddle conduit or passageway and the at least one inflatable air bag when the at least one paddle is detachably coupled to the at least one of the plurality of stackable drive blocks so that the pneumatic air supply can supply air to the at least one inflatable air bag when the pneumatic air supply is energized.

The turbine engine component cleaning system wherein the pneumatic air supply comprises an air delivery shaft that is coupled to at least one of the drive mounts or at least one of the plurality of stackable drive blocks for delivering air thereto.

The turbine engine component cleaning system wherein a predetermined number of the plurality of stackable drive blocks are detachably mounted to at least one of the drive mounts and a predetermined number of the at least one paddles are detachably mounted to the predetermined number of stackable drive blocks; wherein the predetermined number of the plurality of stackable blocks exceeds the predetermined number of the at least one paddles and air is permitted to pass into each of the at least one inflatable air bag.

The turbine engine component cleaning system wherein the turbine engine component cleaning system further comprises a locking plate for locking onto the turbine engine component and adapted to receive and rotatably support the air delivery shaft; wherein the plurality of stackable blocks are stacked in series so that when the plurality of stackable blocks are stacked, at least one block conduit or passageways of all of the plurality of stackable blocks become in fluid communication so that when air is delivered from the pneumatic supply to the air delivery shaft and to a first one of the plurality of stackable blocks, air is permitted to pass serially to each of the other of the plurality of stackable blocks.

The turbine engine component cleaning system wherein the locking plate comprises at least one bearing for receiving and rotatably supporting the air delivery shaft as it rotates.

The turbine engine component cleaning system wherein each of the plurality of stackable drive blocks comprises a valve that becomes actuated from a closed position to an open position when the paddle is detachably mounted thereto.

The turbine engine component cleaning system wherein the frame comprises a plurality of wheels so that the turbine engine component cleaning system is portable.

The method for cleaning a turbine engine component wherein the method further comprises the steps of placing a first block of the predetermined number of blocks onto the drive block support, the first block having a first paddle of the predetermined number of paddles coupled thereto and having a first inflatable bag coupled thereto; stacking at least one additional block onto the first block, the at least one additional block having an additional paddle of the predetermined number of paddles coupled thereto and having an additional inflatable bag coupled to the additional paddle; selecting the first block and the at least one additional block in response to the plurality of surfaces to be cleaned.

The method for cleaning a turbine engine component wherein each of the predetermined number of blocks and the predetermined number of paddles have a conduit or passageway adapted to permit air to pass in order to inflate the inflatable air bag, the method further comprising the steps of mounting an air delivery shaft onto at least one of the first block or the at least one additional block; mounting a support lid onto the turbine component, the support lid having a bearing adapted to receive and support the delivery air shaft; the delivery air shaft having an air conduit for delivering air to the predetermined number of blocks and each of the inflatable air bags and also being rotationally supported by the bearing and adapted to stabilize a rotation of the first block and the at least one additional block while simultaneously providing air to the paddle conduit or passageway, thereby inflating the inflatable air bag.

The method for cleaning a turbine engine component wherein the predetermined number of paddles have a hinge and can pivot about a predetermined axis.

The method for cleaning a turbine engine component wherein the inflatable air bag comprises at least one of integrally formed strips or wipers or detachable strips or wipers that are detachably secured, permanently secured or integrally formed with the inflatable air bag in a predetermined position.

The method for cleaning a turbine engine component wherein the plurality of surfaces to be cleaned are spaced, interior, generally parallel, non-parallel, radial, perpendicular, arcuate, interrupted, polygonal or the like.

The method for cleaning a turbine engine component wherein the plurality of surfaces to be cleaned are generally parallel and generally planar.

The method for cleaning a turbine engine component wherein at least one of the plurality of surfaces to be cleaned is spaced from another surface to be cleaned, interior to the at least one turbine engine component, generally parallel to another surface to be cleaned, non-parallel to another surface to be cleaned, radial, perpendicular, arcuate, interrupted, polygonal or the like.

These and other objects and advantages of the invention will be apparent from the following description, the accompanying drawings and the appended claims.

BRIEF DESCRIPTION OF THE ACCOMPANYING DRAWINGS

The patent or application file contains at least one drawing executed in color. Copies of this patent or patent application publication with color drawing(s) will be provided by the Office upon request and payment of the necessary fee.

FIG. 7 is a sectional view illustrating various details of the embodiments shown in FIGS. 1-6.

FIG. 8 is a sectional front view of the embodiment, illustrating a locking plate mounted on the air delivery shaft and also showing various details of the inflatable air bags and paddles;

FIG. 9 is a sectional view of the embodiment shown in FIGS. 1-8 illustrating the part mounted on the system and also illustrating the relationship of the plurality of paddles after they are mounted to the drive blocks and the drive blocks are mounted on top of each other illustrating how the paddles become situated in generally opposed relationship to at least one or a plurality of surfaces to be cleaned.

Figure 12:
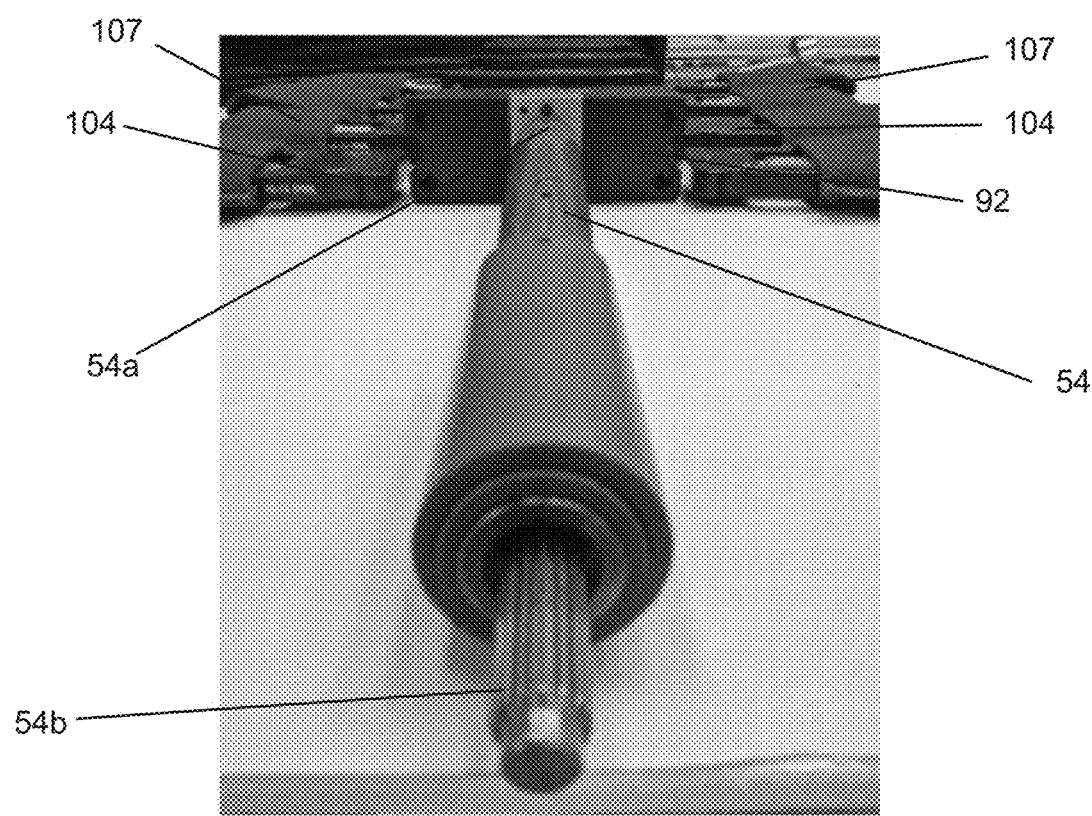
Figure 13:
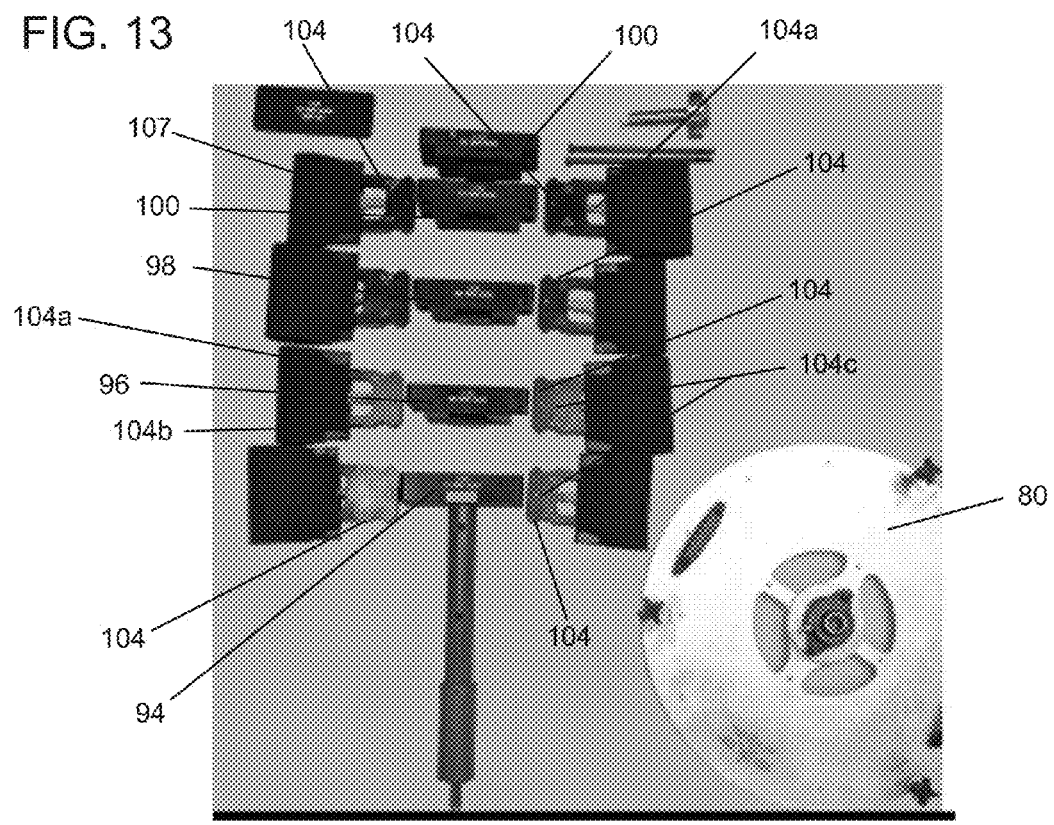
Figure 14:
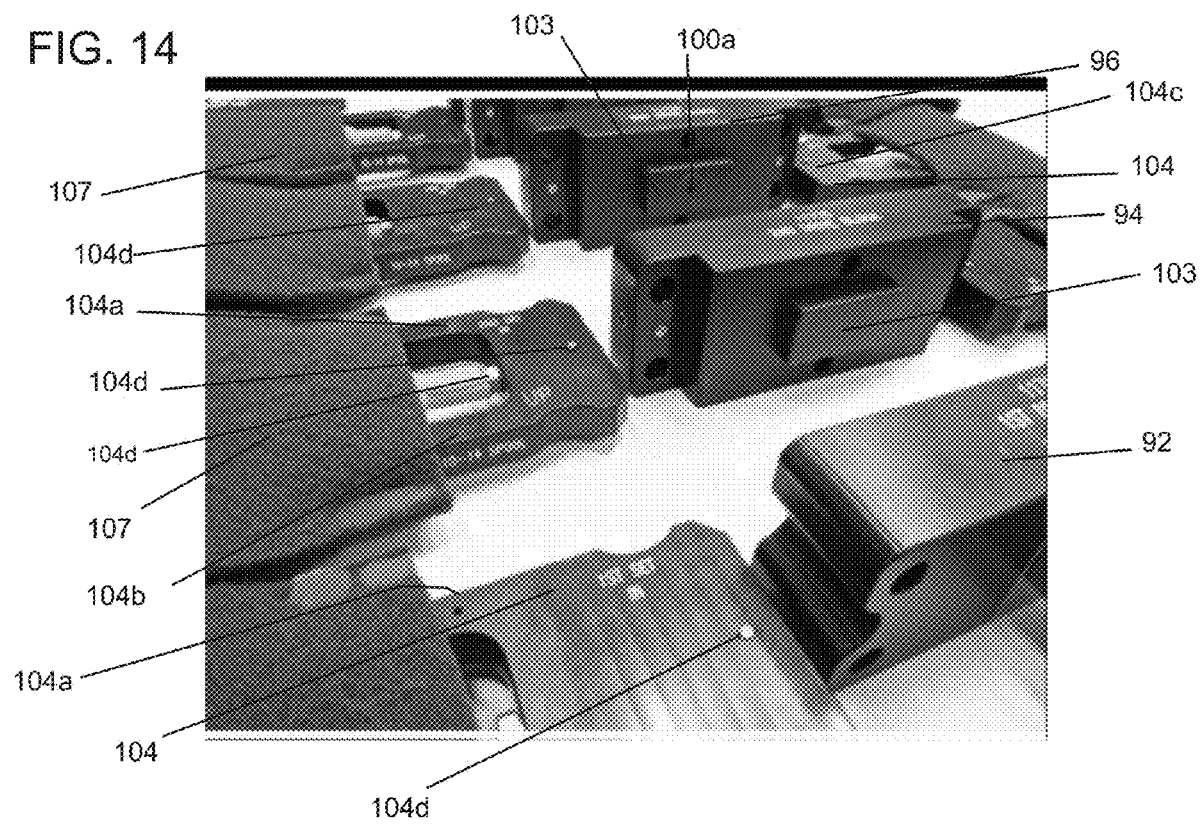
Figure 14A:
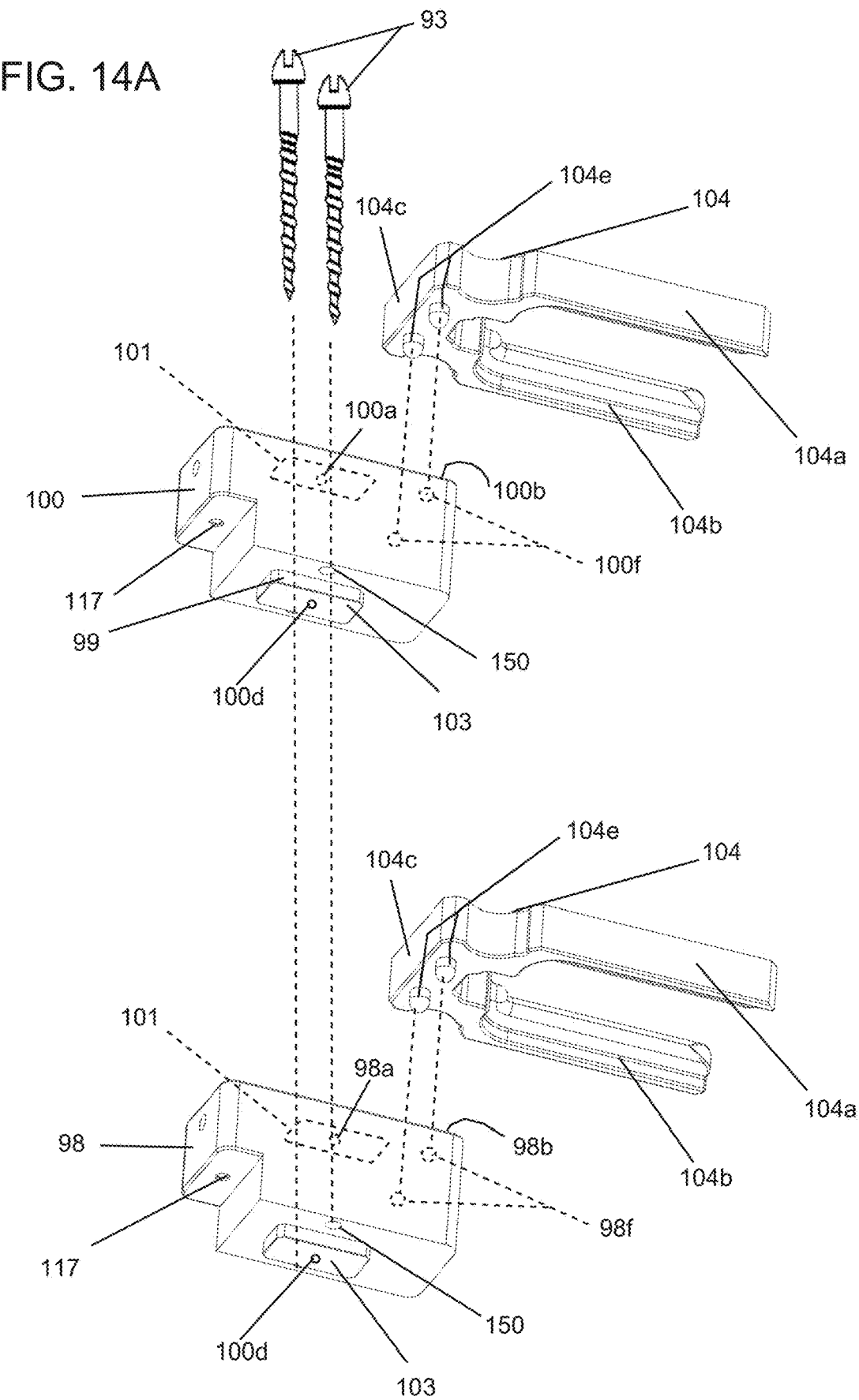
Figure 14C:
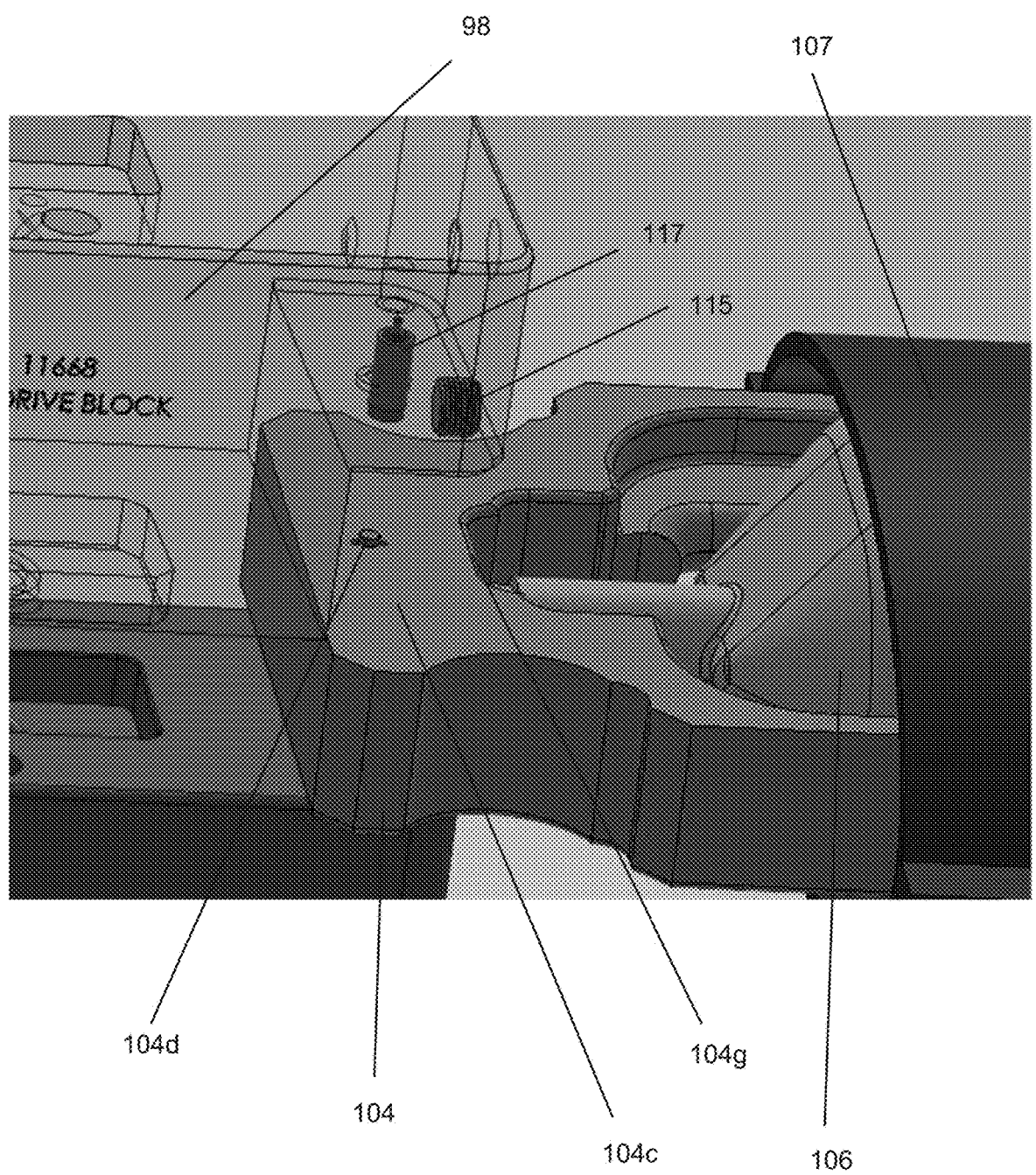
Figure 14D:
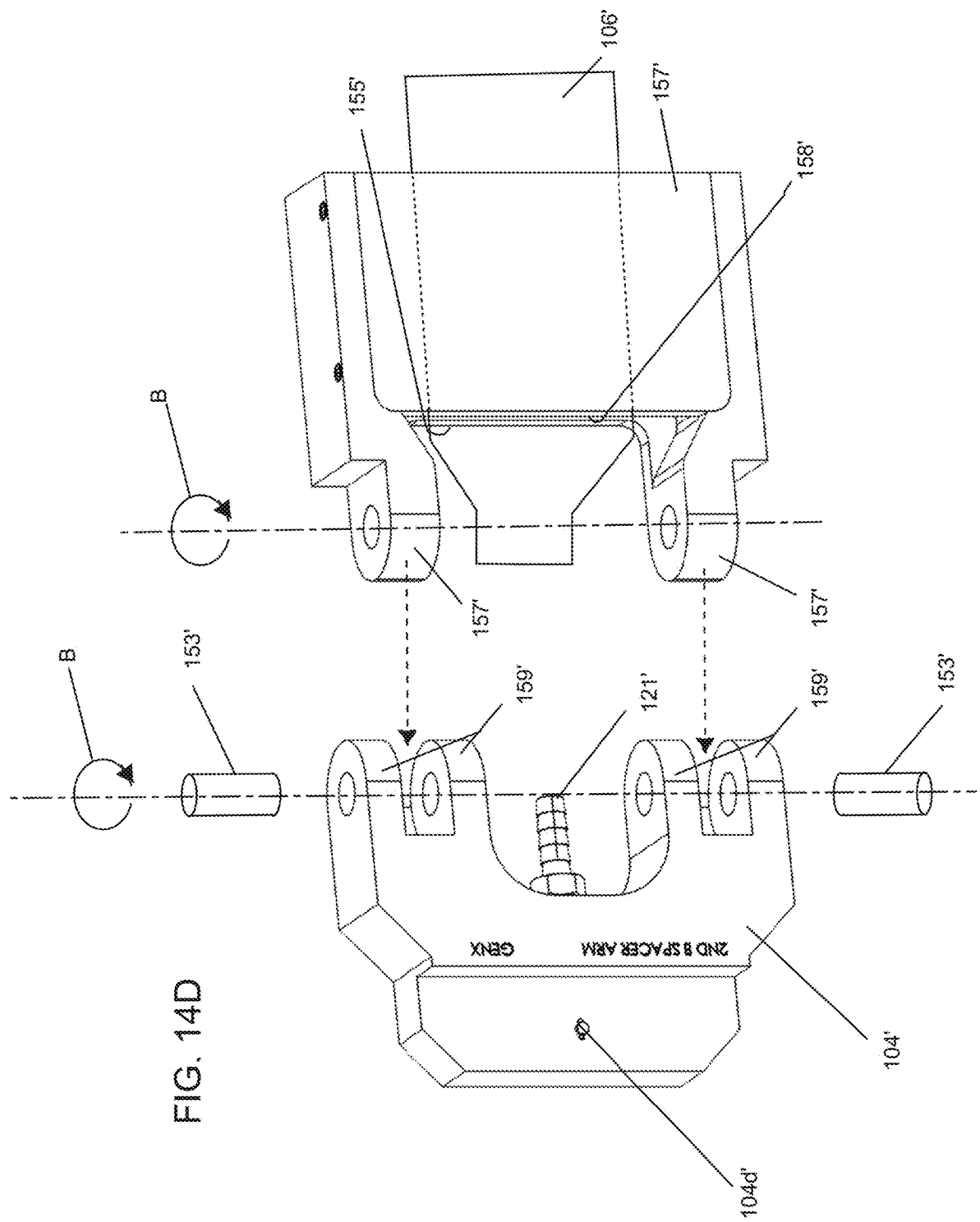
Figure 14E:
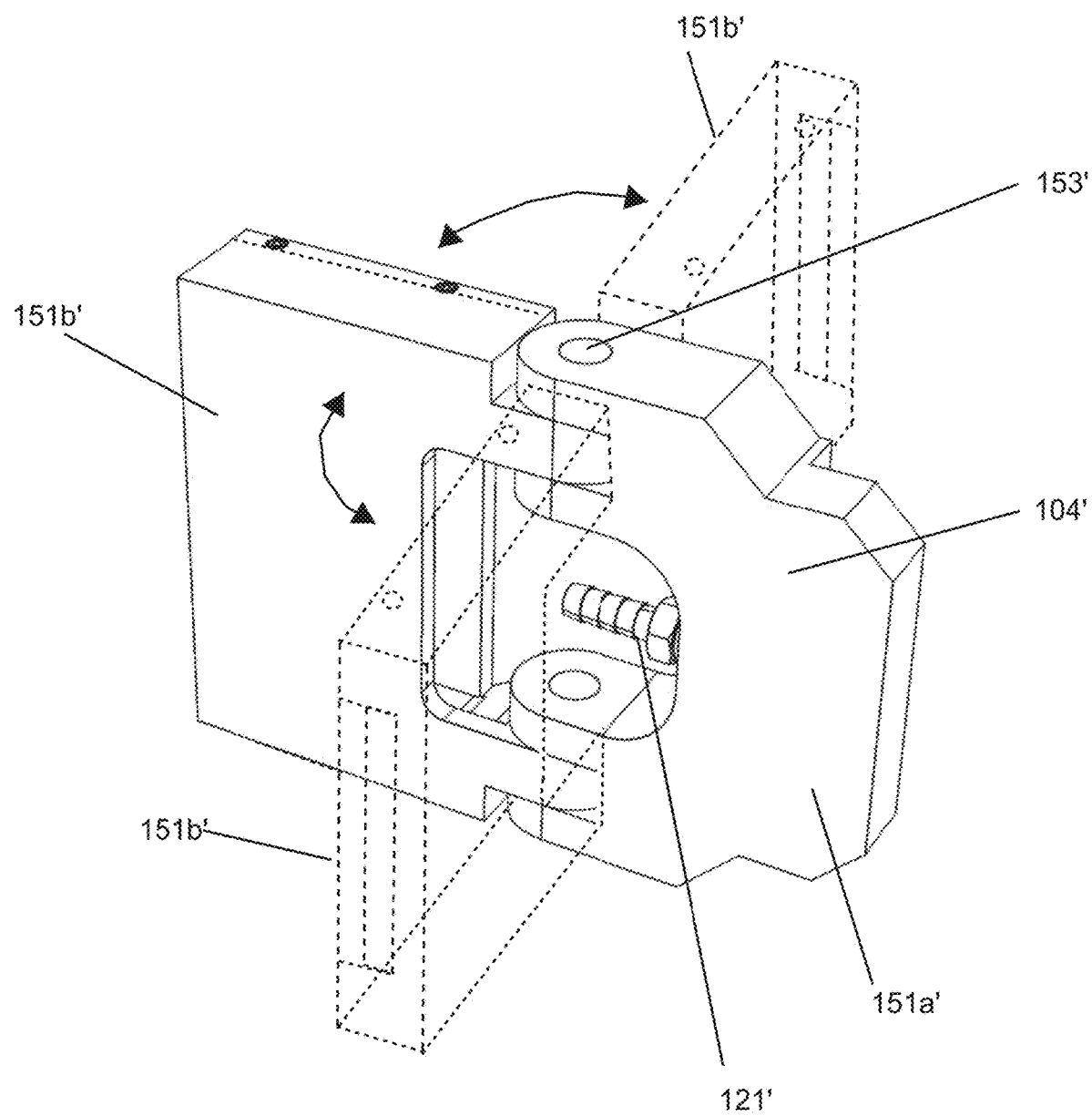
Figure 14H:
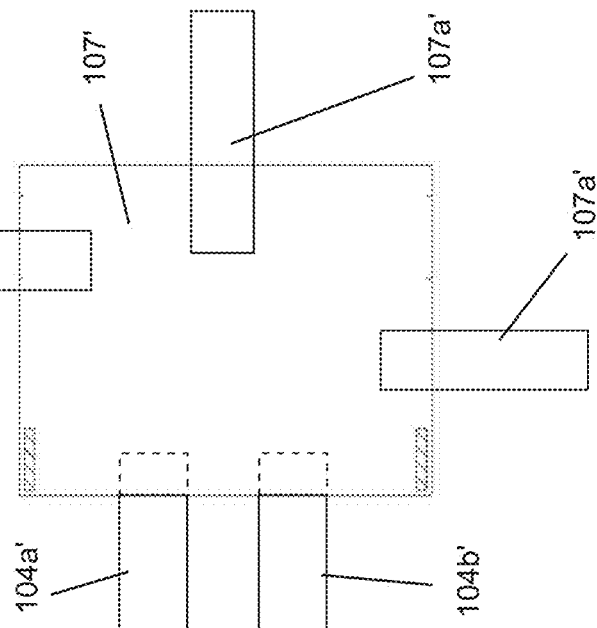
Figure 14F:
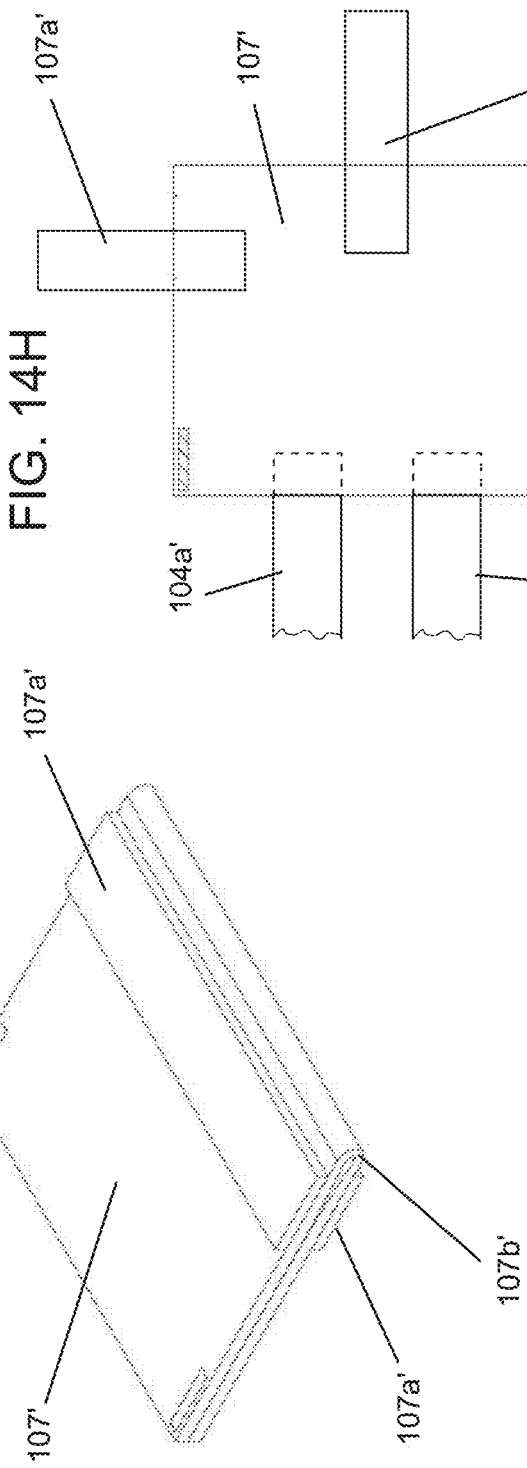
Figure 14G:
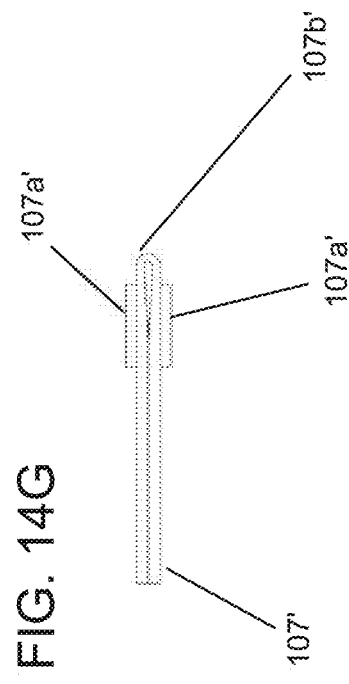

FIG. 10 is an enlarged illustration of another embodiment showing only two drive blocks and two paddles, illustrating that the system may utilize at least one or a plurality of paddles or one or a plurality of inflatable air bags and associated abrasive pads or bags for cleaning the surfaces of the part to be cleaned;

FIG. 11 is a sectional view illustrating various details of the embodiment shown in FIG. 10;

FIG. 12 is a view showing, a support block and associated drive shaft and a plurality of drive blocks having a plurality of inflatable bags and abrasive bags mounted thereon in an illustrative exploded view and also showing a plan view of the locking plate;

FIGS. 13-14 is are views showing various details of the invention, each block having male locater projections and a complementary shaped aperture for receiving the projections;

FIG. 14A is an exploded view showing details of the stackable drive blocks and paddle assemblies;

FIG. 14B is an exploded and sectional view showing details of a paddle, an air bag and a stackable drive block;

FIG. 14C is an exemplary view of a paddle and a stackable drive block showing details of a nipple and a valve that are situated in an adjacent drive block;

FIG. 14D is an exploded view of another embodiment of a paddle that is hingeable;

FIG. 14E is a view of the paddle shown in FIG. 14D;

FIGS. 14F-14H illustrate a bag for an inflatable air bag comprising at least one abrasive strip to aid in cleaning, polishing or scrubbing the part to be cleaned; and FIG. 15 is a schematic of one illustrative process for cleaning the turbine engine component and its interior surfaces.

DETAILED DESCRIPTION OF THE PREFERRED EMBODIMENTS

Figure 1:
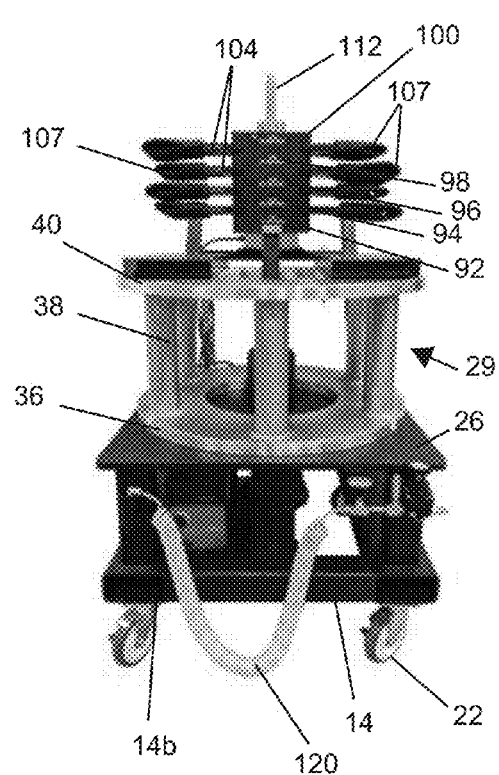
FIG. 1 is a view of a system, method and means for cleaning a turbine engine component.
Figure 2:
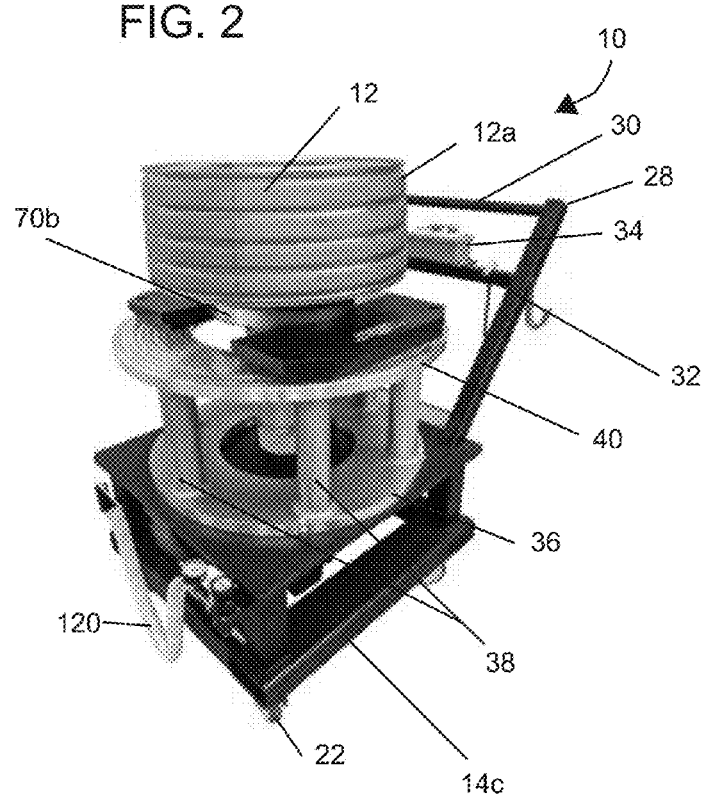
FIG. 2 is a perspective view the embodiment shown in FIG. 1, illustrating a part to be cleaned mounted on the system.
Figure 2A:
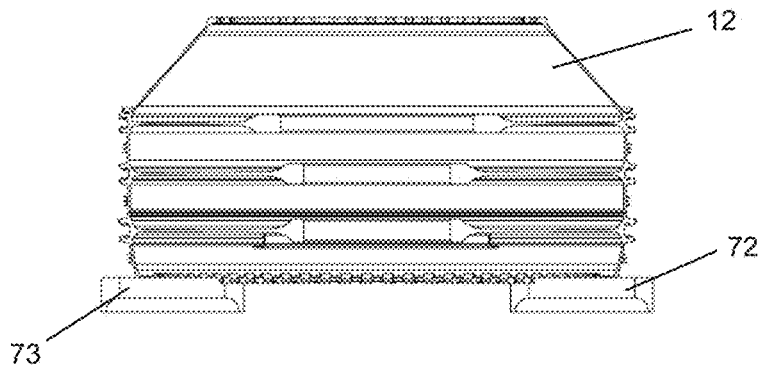
FIGS. 2A-2C illustrate an example of a turbine engine component part to be polished, scrubbed and/or cleaned.
Figure 2B:
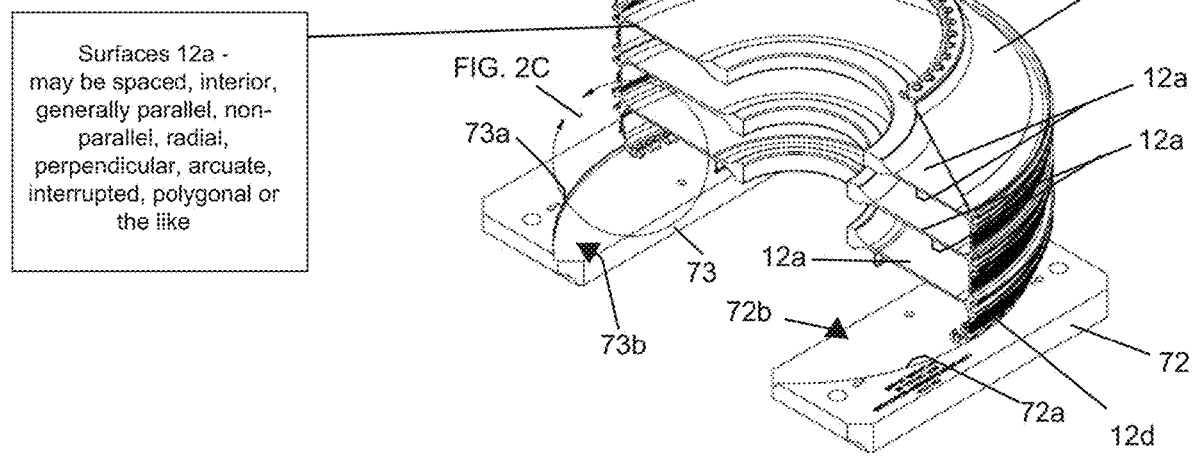
Figure 2C:
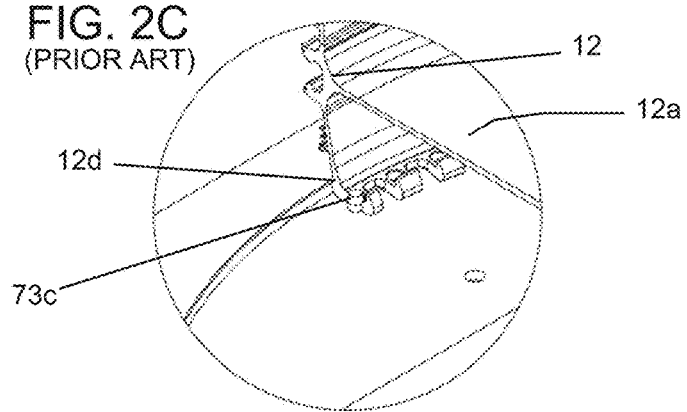
Figure 3A:
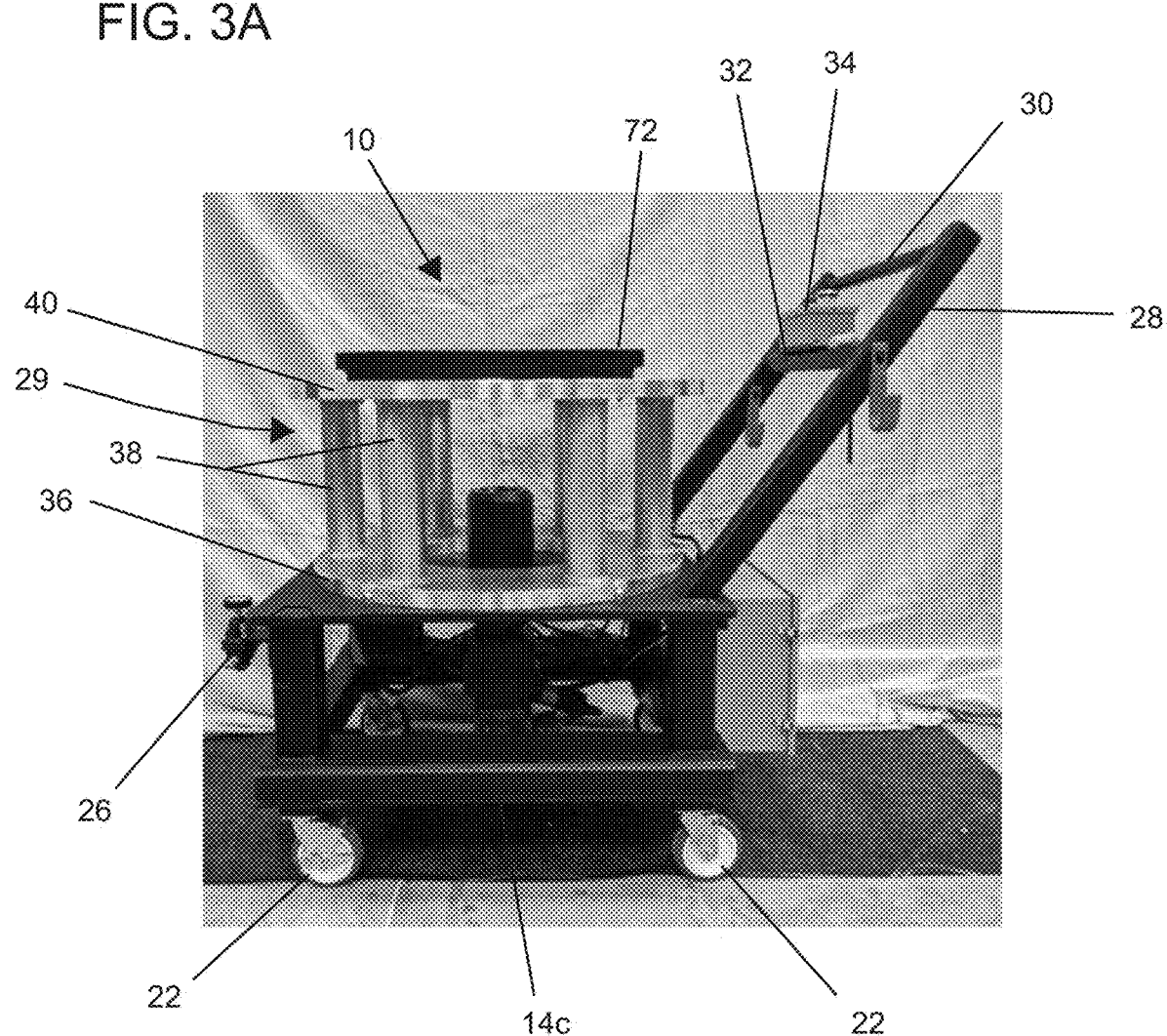
FIG. 3A is a right side view of the embodiment shown in FIG. 1.
Figure 3B:
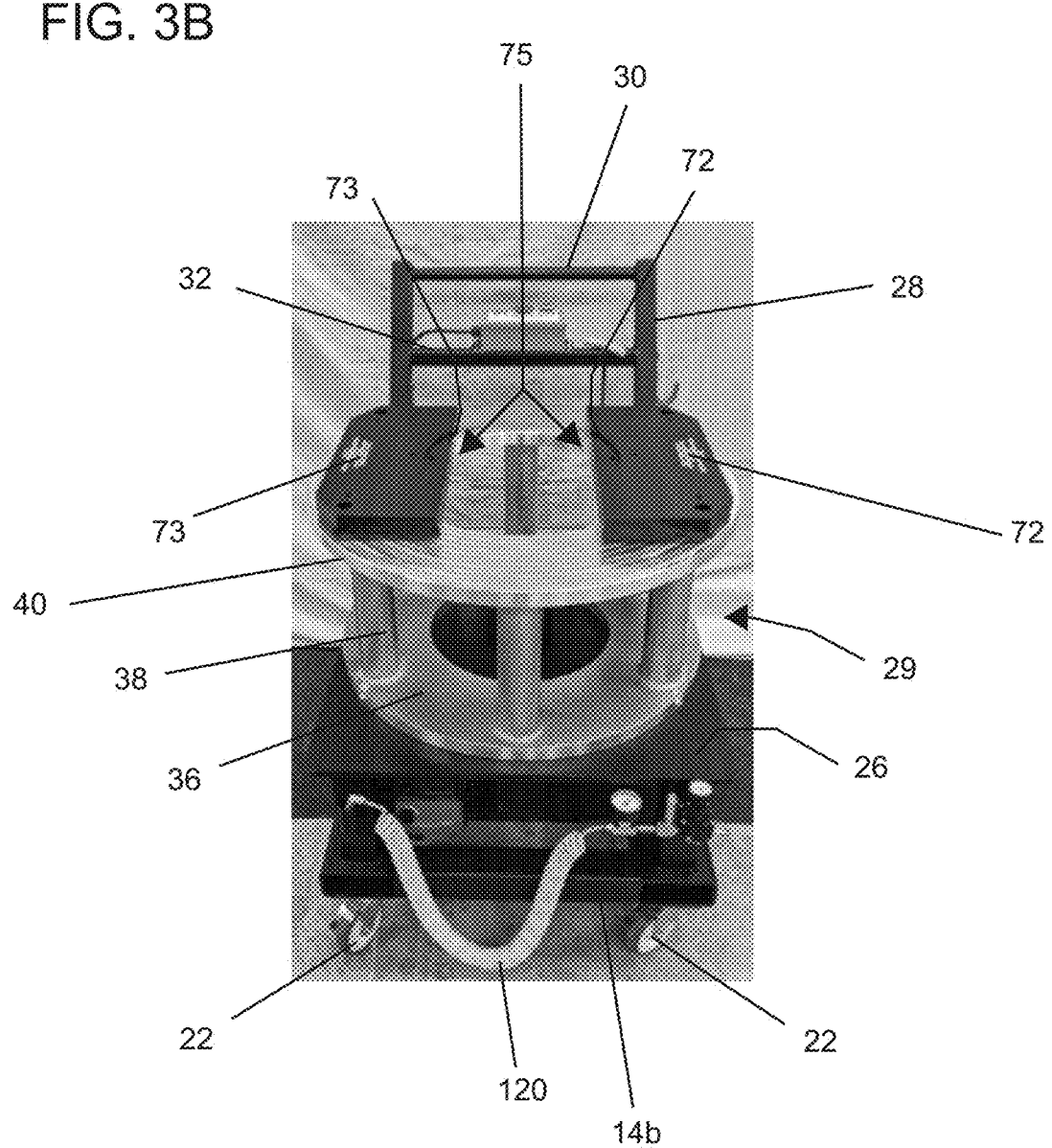
FIG. 3B is a front view of the embodiment shown in FIG. 1, illustrating various features of the locating plates mounted on a riser.
Figure 4:
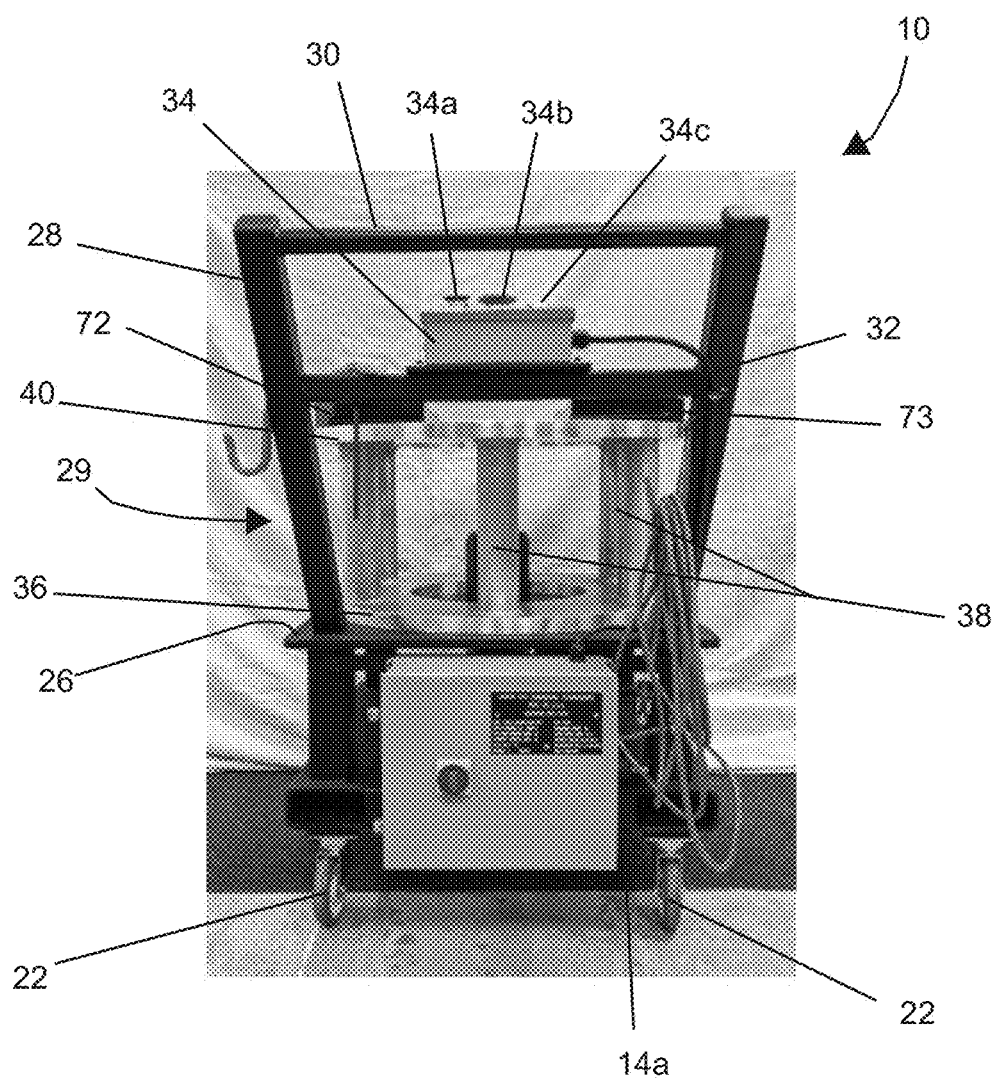
FIG. 4 is a rear view of the embodiment shown in FIG. 1.

Referring now to FIG. 1, a turbine engine component cleaning system and process 10 is shown. The turbine engine component cleaning system and process 10 is adapted particularly for use with cleaning a turbine engine component or part 12 (FIG. 9) that comprises a plurality of surfaces 12a that need to be cleaned. In some embodiments, the turbine engine component cleaning system and process 10 cleans all geometry of surfaces, parallel, non-parallel, perpendicular, uneven, flat or planar, non-planar and the like. The turbine engine component cleaning system and process 10 comprises a frame 14 having a plurality of channel members 14a-14d that are assembled and fastened or welded together to provide a support base 16 for supporting the components of the turbine engine component cleaning system and process 10. Notice that at least two frame components, such as frame components 14a and 14c in FIG. 7, have interior walls 14a1 and 14c1 that each define a first aperture 18 and a second aperture 20, respectively, that are sized and adapted to receive forks (not shown) of a forklift truck or other device lifting and/or moving the turbine engine component cleaning system and process 10.

The support base 16 may comprise a plurality of wheels, such as rotatable caster wheels 22, so that the turbine engine component cleaning system and process 10 is portable and easily moved by hand. In this regard, the turbine engine component cleaning system and process 10 further comprises a plurality of vertical support posts 24 that support a generally planar support plate 26 as shown. A handle 28 is secured to the support plate 26 by conventional means, such as a weld, fastener or the like, and comprises a first generally horizontal support component 30 for grasping when moving the turbine engine component cleaning system and process 10 to a desired position. Notice that the handle 28 also comprises a second generally horizontal support component 32 that is adapted to receive and support a control and switch box 34 for controlling an operation of the turbine engine component cleaning system and process 10 in a manner described later herein.

The turbine engine component cleaning system and process 10 further comprises a riser assembly 29 (FIG. 1) having a generally cylindrical first support plate 36 that is conventionally mounted on the support plate 26 and comprises a plurality of support columns 38 as shown. The support columns 38 support a generally cylindrical second support plate 40 that is generally parallel and opposes the first support plate 36. The plurality of support columns 38 cause the second support plate 40 to be spaced a predetermined distance from the first support plate 36. Although not shown, it should be understood that a second plurality of support columns 38 of different lengths could be provided, selected and adapted to change the predetermined distance at which the first support plate 36 is separated from the second support plate 40. The predetermined distance may be determined in part by the turbine engine component or part 12 being wiped, scrubbed or polished by the turbine engine component cleaning system and process 10. In this example, the predetermined distance is about 14 inches.

As best illustrated in FIG. 8, note that a drive motor 52 is conventionally mounted on the support plate 26. In the illustration being described, the drive motor 52 is an AC motor ½ HP and comprises an M1 mounting, but other types and sizes of motors could be used. The drive motor 52 receives power from a conventional power supply (not shown) that is coupled to and under the control of the control and switch box 34 mentioned earlier. In this regard, the control and switch box 34 comprises an on/off button or switch 34a, an emergency stop button or switch 34b and an activation light 34c for allowing a user to know when the turbine engine component cleaning system and process 10 is active.

Figure 8A:
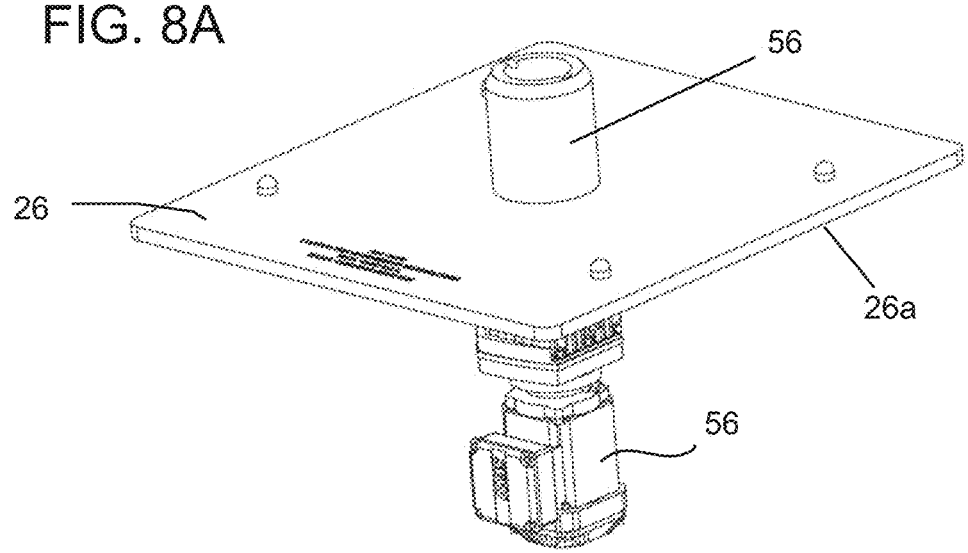
FIG. 8A illustrates a drive motor and bearing assembly as mounted on a support plate.
Figure 8B:
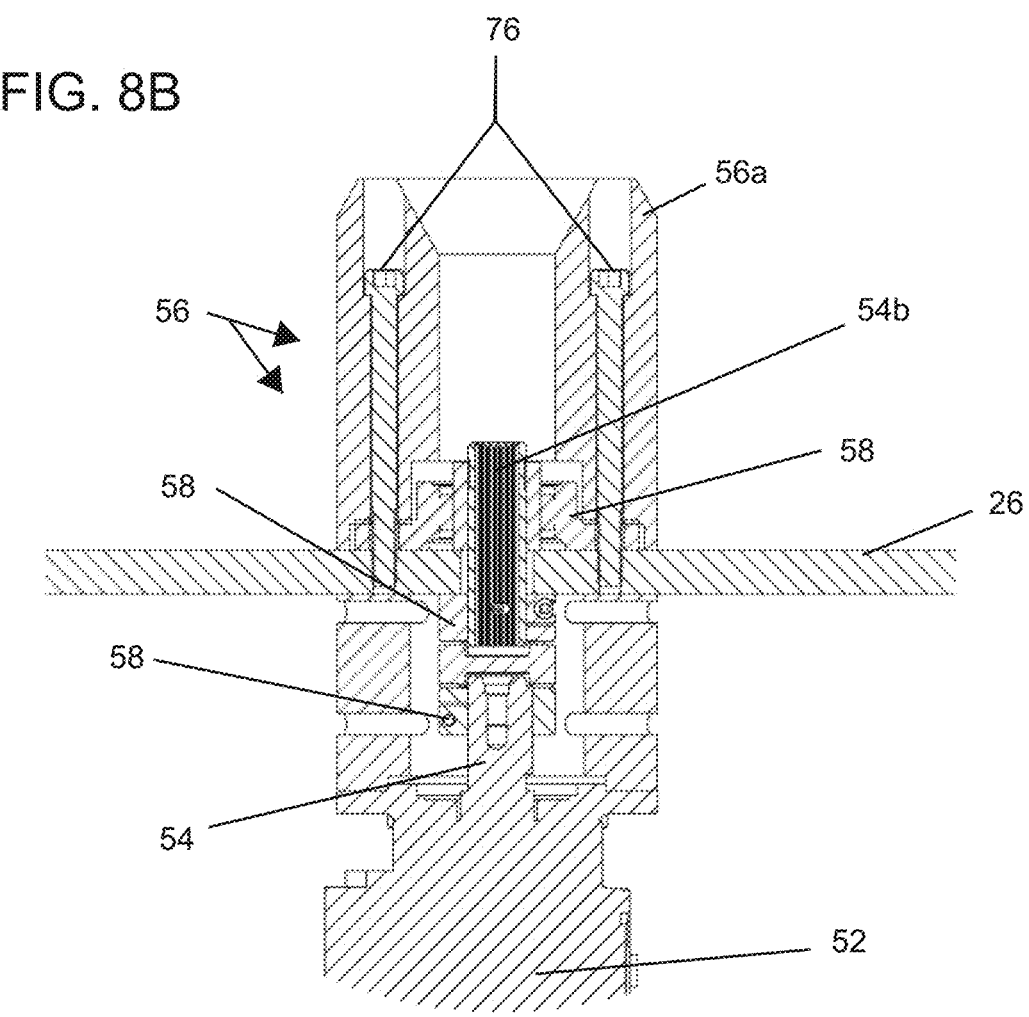
FIG. 8B is a sectional view showing details of the bearing assembly and motor.
Figure 8C:
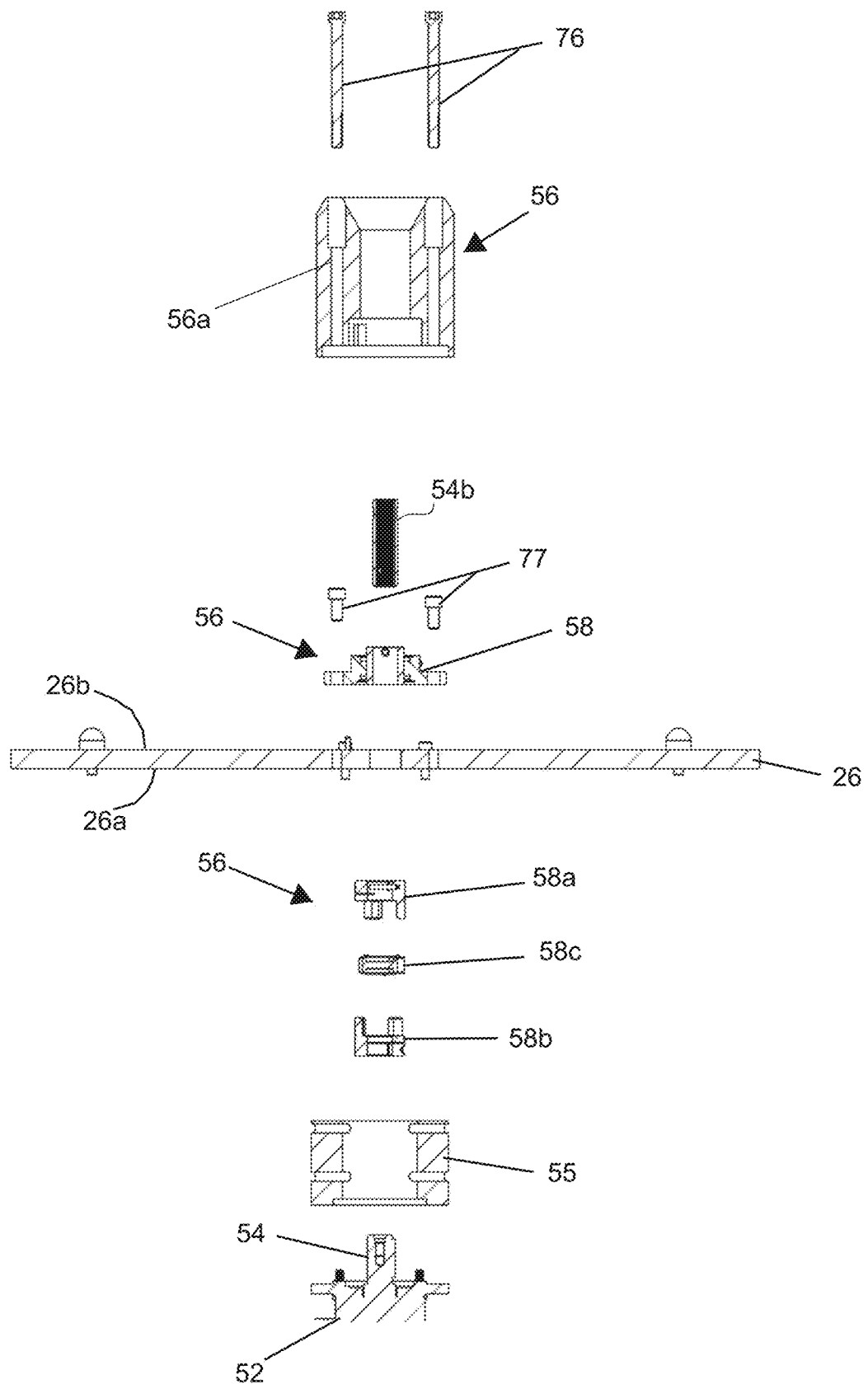
FIG. 8C is an exploded view showing various details of the bearing assembly and motor.

Referring now to FIGS. 8, and 8A-8C, notice that the drive motor 52 comprises a primary drive shaft 54 that has a splined end 54b secured thereto and that receives a drive shaft extension 54a (FIGS. 8, 8A-8C and 9). The motor 52 is conventionally mounted to an underside 26a of the support plate 26. Notice that a spindle or bearing assembly 56 is mounted on a top surface 26b of the support plate 26 and comprises an outer support collar or sleeve 56a that is mounted onto the support plate 26 using conventional bolts 76 as illustrated in FIG. 8C. The spindle or bearing assembly 56 comprises a plurality of bearings 58 that are secured to the support plate 26 with fasteners 77. A support collar 55 is also mounted onto the drive motor 52 and the underside 26a of the support plate 26. The support collar 55 is a spacing block to provide space between the support plate 26 and the drive motor 52 for the spline and motor coupling components. Additional bearings 58a, 58b and a sleeve 58c are received on the drive shaft 54 and secure the end 54b to the drive shaft 54.

As best illustrated in FIGS. 8, 8A-8C and 9, the drive motor 52 rotatably drives the primary drive shaft 54 that is supported and received in the bearing assembly 56. Notice that the first and second support plates 36 and 40 comprise an interior wall 36a and interior wall 40a, respectively, that define apertures 42 and 44, respectively. The primary drive shaft 54 is rotatably mounted to or received in the bearing assembly 56 which maintains the primary drive shaft 54 in a generally centrally-located position in both the apertures 42 and 44 as shown.

In the example, the primary drive shaft 54 is coupled to a pneumatic manifold assembly 59 (FIG. 11) via the drive shaft extension 54a, both of which will be described in more detail later herein.

The bearing assembly 56 comprises the outer support collar or sleeve 56a that is sized and adapted to engage, receive and support a wall 70a of the turbine engine component of part 12 to be scrubbed, polished or cleaned. In this regard, the turbine engine component cleaning system and process 10 is primarily adapted for use in cleaning the turbine engine components or parts 12 that have the plurality of surfaces 12a to be cleaned, but it could be used with other parts (not shown) other than turbine engine components. Note that the surfaces 12a may be generally parallel spaced surfaces, such as the plurality of surfaces 12a mentioned earlier herein, but they could be non-parallel, perpendicular, planar, non-planar, interrupted, circular, non-circular and the like.

FIGS. 2, 2A-2C and 8A-8C show one illustration of the turbine engine component or part 12 mounted and supported on the bearing assembly 56 (FIG. 9). Of course, it should be understood that the support collar or sleeve 56a is fastened to the support plate 26 with the bolts 76 (FIG. 8B) and is stationary during operation. The outer support collar or sleeve 56a is adapted to be changed if necessary with another collar or sleeve (not shown) that is sized and adapted to fit a second turbine engine component or part (not shown) having similar or different surfaces to be scrubbed, cleaned or polished.

Referring now to FIGS. 2A-2D, details of one example of the part 12 are shown. It should be understood that while this part is a turbine engine component, the turbine engine component cleaning system and process 10 may be used with other parts 12 (not shown) that are in need of having surfaces being cleaned and scrubbed. Notice in the sectional view of FIG. 2B that the part comprises the plurality of surfaces 12a to be cleaned. In this exemplary embodiment, notice that the surfaces 12a are generally parallel and some of the surfaces oppose each other, as illustrated. It should be understood, however, that the surfaces 12a do not always have to be parallel and they can be perpendicular or spaced. Notice that support and centering locators 72, 73 (FIG. 2B) have internal walls 72a and 73a that define recessed areas 72b and 73b that are adapted, sized and complementary shaped to receive a bottom portion or edge 12d of the part 12, as illustrated. Note that one or more locating pins 73c or fasteners may be used to secure the part onto the support and centering locators 72, 73. Thus, the turbine engine component cleaning system and process 10 comprises the pair of support and centering locators 72, 73 that are adapted and sized to receive and support at least a portion of the turbine engine component or part 12 (FIG. 9) to be cleaned.

As illustrated, the walls 72a and 73a cooperate to define a circumference and shape that generally complements a circumference and shape defined by an edge 12d of the turbine engine component or part 12. Accordingly, the locators 72 and 73 not only cooperate to locate the turbine engine component or part 12 on the second support plate 40 of the riser assembly 29, but also stabilize the turbine engine component or part 12 during the polishing, scrubbing and/or cleaning process. During operation of the turbine engine component cleaning system and process 10, the turbine engine component or part 12 remains fixed and stationary after the turbine engine component or part 12 is mounted on the centering locators 72, 73. In this regard, at least one or a plurality of anti-rotation pins or bolts (not shown) may be used to secure and stabilize the turbine engine component or part 12 on the support and centering locators 72, 73 and/or on the support plate 26.

In general, after the turbine engine component or part 12 is mounted on the support and centering locators 72, 73 and fastened thereto, the pneumatic manifold assembly 59 is then assembled and mounted onto the drive shaft extension 54a. Notice in FIG. 11 that the drive shaft 54 and drive shaft extension 54a have a drive shaft axis (labeled A in FIG. 11) that is generally centrally located in the apertures 42 and 44 without the pneumatic manifold assembly 59 mounted thereon. During use, the user first positions and secures the turbine engine component or part 12 onto the support and centering locators 72, 73 which, in turn, causes the axis A of drive shaft 54 of the drive motor 52 to be generally centrally located inside the turbine engine component or part 12. Thereafter, the pneumatic manifold assembly 59 is then mounted on the drive shaft 54 and a locking plate 80 (described later) is mounted onto the pneumatic manifold assembly 59 and the turbine engine component or part 12 in a manner described later herein. It should be understood that the locking plate 80 locks the relative position of the pneumatic manifold assembly 59 and the drive shaft 54 relative to the turbine engine component or part 12. It should be understood that the entire pneumatic manifold assembly 59 and drive shaft extension 54a may be assembled together and then mounted onto the drive shaft 54 after the turbine engine component or part 12 is mounted on the locators 72 and 73.

The pneumatic manifold assembly 59 comprises at least one or a plurality of support blocks 92 that are adapted to receive and support at least one or a plurality of stackable drive blocks 94, 96, 98 and 100 as shown. Each of the plurality of stackable drive blocks 94-100 support at least one or a plurality of cleaner assemblies 102 that are selectively and detachably mounted to the at least one or a plurality of the stackable drive blocks 94-100 as shown and described herein. The plurality of stackable drive blocks 94-100 nest and stack together as shown. In this regard, note that each of the plurality of stackable drive blocks 94-100 have a generally rectangular projection, such as a male projection 103 (FIG. 14A) that is received in a complementary-shaped rectangular aperture 101 (FIG. 14A) defined by a wall 99 in the support block 92. It should be understood that each stackable drive block 96-100 can be stacked in any order on top of each other and/or on support block 92. Consequently, each stackable drive block 94-100 has the male projection 103 and the rectangular aperture 101.

In this example, each of the plurality of cleaner assemblies 102 comprises at least one paddle 104 and at least one inflatable air bag 106 that is coupled to the at least one paddle 104 in the manner described herein. Note that the paddle is generally U-shaped and comprises arms 104a, 104b (FIGS. 14 and 15) joined by a joining portion 104c. Each joining portion 104c (FIGS. 13-14E) may optionally have at least one of the inflatable air bags 106 coupled thereto. The at least one paddle 104 and air bag 106 are adapted to receive and comprise a pad, scrubber, sock, cover or bag 107 (FIG. 14), which in the illustration being described is a Scotch-Brite™ cover that is placed over the at least one paddle 104 as illustrated. For ease of illustration, part 107 will collectively be referred to as a bag.

In the illustration being described and during use, after the pneumatic manifold assembly 59 is mounted to the drive shaft extension 54a, which is mounted on the drive shaft 54, and the locking plate 80 is mounted thereon, notice that the at least one or a plurality of paddles 104 and their inflatable air bags 106 are positioned in operative relationship with the at least one or plurality of surfaces 12a to be polished, scrubbed or cleaned, as illustrated in FIGS. 1, 2, 7 and 9. Thereafter, the inflatable air bags 106 may be inflated which urges or causes the bag 107 to engage one or both of the opposing surfaces 12a of the turbine engine component or part 12 being cleaned so that when the drive motor 52 is energized, the pneumatic manifold assembly 59 rotates which causes the at least one paddle 104 to rotate and polish, scrub and/or clean the plurality of surfaces 12a of the turbine engine component or part 12 to be cleaned.

Once the turbine engine component or part 12 is mounted on the support and centering locators 72, 73 (see FIGS. 2 and 9) and the pneumatic manifold assembly 59 is mounted on the drive shaft 54 and the locking plate 80 is mounted on the pneumatic manifold assembly 59, the user may actuate the switch 34a (FIG. 4) which causes the drive motor 52 to rotatably drive the entire pneumatic manifold assembly 59. In order to maintain stability and to supply fluid to the pneumatic manifold assembly 59, an air delivery shaft 112 is mounted or coupled to the last one of the stackable drive blocks 94-100, namely block 100 in the example shown in FIG. 9. The locking plate 80 has a bearing 113 that is sized and adapted to receive the air delivery shaft 112 and support the pneumatic manifold assembly 59 during rotation of the pneumatic manifold assembly 59 as shown.

It should be understood that the number of the plurality of stackable drive blocks 94-100 and the plurality of cleaner assemblies 102 that are used and mounted on the at least one or a plurality of stackable drive blocks 94-100, is dependent, in part, upon the turbine engine component or part 12 and its plurality of surfaces 12a to be cleaned. Notice in the illustration in FIG. 8 that four stackable drive blocks 94-100 are used and support a plurality of the cleaner assemblies 102. FIG. 8 shows the stackable drive blocks 94, 96, 98 and 100 each having a pair or a plurality of the cleaner assemblies 102 mounted thereto. In contrast, the stackable drive block 96 shows only one cleaner assembly 102 mounted thereto, but two paddles 104 mounted thereto. The paddle 104 does not have an air bag 106 mounted thereto. It should also be understood that the number of stackable drive blocks 94-100 used may change and more or fewer stackable drive blocks 94-100 may be used and will depend upon the turbine engine component or part 12 being cleaned, scrubbed or polished.

Thus, it should be understood that once the number of stackable drive blocks 94-100 are selected, they are stacked as shown. The locking plate 80 is mounted on the turbine engine component or part 12 and rotatably supports the air delivery shaft 112 that is mounted on the last of the stackable drive blocks 94-100, which in the illustration, is stackable drive block 100. The air delivery shaft 112 is adapted to be coupled to a pneumatic air supply 119 with an air hose 120 (FIG. 5) as shown. It should be understood that the plurality of stackable drive blocks 94-100 each have a pneumatic channel or conduit which permits delivered air to pass from the pneumatic air supply 119 (FIGS. 8 and 9) into and through the plurality of stackable drive blocks 94-100. The plurality of stackable drive blocks 94-100 delivers the air to the plurality of paddles 104 and air bags 106 so that they can be inflated when desired. The pneumatic delivery system and the conduits in the plurality of stackable drive blocks 94-100 that enable air to be delivered to the plurality of cleaner assemblies 102 will now be described.

FIGS. 10 and 11 are views of an embodiment having only two of the stackable drive blocks 94-100 for ease of illustration. Notice in FIG. 12 that the support block 92 is coupled to the drive shaft extension 54a by conventional means, such as a splined connection or end, a weld or a threaded connection. The drive shaft 54 is conventionally coupled to a first end 54a1 (FIG. 11) of the drive shaft extension 54a, which couples the drive shaft 54 and the drive shaft extension 54a directly to the drive motor 52, with the opposite end 54b being coupled directly to the support block 92. As mentioned earlier, the outer support collar or sleeve 56a (FIGS. 8, 8A-8C and 9) of the bearing assembly 56 is mounted on the support plate 26 and rotatable supports of the drive shaft extension 54a and the sleeve 56a simultaneously engage and support the interior wall 70a of the turbine engine component or part 12 that is received in and supported by the outer support collar or sleeve 56a. The outer support collar or sleeve 56a is mounted to the support plate 26 using conventional bolts 76 (FIG. 8B) as shown.

Thus, in the illustration being described, the outer support collar or sleeve 56a provides lateral and rotary support for the drive shaft 54 and drive shaft extension 54a as they rotate in the bearing assembly 56, as well as stabilizing support for the turbine engine component or part 12 during operation.

Referring back to FIGS. 7-11, the end 54b of the drive shaft extension 54a comprises the support block 92 to the drive shaft extension 54a. The support block 92 (FIG. 11) comprises an internal generally rectangular wall 92d (FIG. 11) that defines a generally rectangular recessed area 95 for receiving a complementary-shaped male projection or extension 98c of one of the at least one of the plurality of stackable drive blocks 94-100 as shown. For example, notice in the example in FIG. 8 that the stackable drive block 94 is simply stacked and mounted directly on top of the support block 92 and stackable drive block 96 is stacked and mounted directly onto the stackable drive block 94. Further explanation of the stabilizing and mounting of the plurality of stackable drive blocks 94-100 is shown in the example of FIGS. 13-14B. Thus, if multiple levels of cleaning and scrubbing are necessary in the turbine engine component or part 12, then other stackable drive blocks, such as stackable drive blocks 96-100, can be directly mounted or stacked onto the stackable drive block 94 or each other as shown.

The number of stackable drive blocks 94-100 that are mounted onto the support block 92 is determined and selected in response to the turbine engine component or part 12 and its plurality of surfaces 12a that are to be cleaned or scrubbed.

After the turbine engine component or part 12 is mounted on the locators 72, 73, the plurality of stackable drive blocks 94-100 are selected, stacked and assembled as shown, they are secured and conventionally fixed to the support block 92, such as by the use of bolts 93 (FIG. 14A) that pass or traverse through all of the plurality of stackable drive blocks 94-100 and are threaded into mating female apertures (not shown) in the support block 92. Thereafter, the fluid or air delivery shaft 112 is mounted on the last or top (as viewed in the Figures) stackable drive block 100, and the locking plate 80 is mounted or placed onto the turbine engine component or part 12. Notice that the locking plate 80 has a plurality of fasteners 110 that are generally L-shaped and grip the inside of or an inner wall 12e (FIG. 2B) of the turbine engine component or part 12. It should be understood that the locking plate 80 and the turbine engine component or part 12 do not rotate during operation or while the plurality of stackable drive blocks 94-100 rotate during cleaning and scrubbing.

As mentioned earlier, each of the plurality of stackable drive blocks 94-100 have the same or similar pneumatic channel or conduit (labeled 100d in FIG. 14A for stackable drive block 100). The channels or conduits of each stackable drive block 94-100 become coupled together and in fluid communication when the plurality of stackable drive blocks 94-100 are stacked so that each of the conduits from each of the stackable drive blocks 94-100 cooperate to define a continuous conduit or passageway adapted to deliver fluid, such as air, from the pneumatic air supply 119 (FIG. 8) to each of the stackable drive blocks 94-100 and any of the inflatable air bags 106 that may be attached to any one of the plurality of stackable drive blocks 94-100. Before the locking plate 80 is mounted on the last or top stackable drive block 100, an end 112e (FIG. 11) of the air delivery shaft 112 is mounted in a generally U-shaped channel 100b of the top stackable drive block 100 as shown. The air delivery shaft 112 has a conduit 112b and a valve 112a for coupling to the air hose 120 (FIG. 5) that is coupled to the pneumatic air supply 119 that delivers air to an air regulator 122 (FIG. 5) and the air delivery shaft 112.

Notice in FIG. 11 that the conduit 112b in the air delivery shaft 112 extends the entire length of the air delivery shaft 112, and a coupler end 112c comprises a conventional air relief valve 115. As alluded to earlier, note that the coupler end 112c has the generally rectangular male projection or end 112e that is received in and mates with the complementary-shaped female aperture or channel 100b (FIG. 11). Thus, the end 112e of the air delivery shaft 112 is sized and adapted to fit in the area or channel 100b in the stackable drive block 100 as shown.

Each of the stackable drive blocks 94-100 comprises a generally L-shaped air conduit, such as the air conduit 100d in stackable drive block 100, defined by an internal wall 100d1 that permits air to pass into and through the stackable drive block 100 and to any air bags 106 that are coupled thereto. Notice that when the air delivery shaft 112 is mounted onto the stackable drive block 100, the conduit 112b becomes in fluid communication with the conduit 100d so that air from the pneumatic air supply 119 (FIG. 8) can be delivered through the air delivery shaft 112 and into the stackable drive block 100 and ultimately to any inflatable air bag 106 that is coupled to the stackable drive block 100.

Returning to FIGS. 8-11, note that each stackable drive block 94-100 comprises an air valve 117 which in the illustration being described, is a Schrader valve, which is similar to a conventional bicycle tire valve. All stackable drive blocks 94-100 have a similar configuration and air valve 117 and their respective conduits become coupled in fluid communication with each other when the stackable drive blocks 94-100 are stacked. This enables any air bags 106 coupled to the stackable drive blocks 94-100 to become inflated when the turbine engine component cleaning system and process 10 is energized.

Features of the stackable drive blocks 94-100 and various cleaner assemblies 102 will now be described relative to the stackable drive blocks 98 and 100 shown in FIGS. 10-14A, but it should be understood that each of the stackable drive blocks 94-100 are similarly constructed. As illustrated in FIG. 11, notice that each of the plurality of paddles, such as paddle 104 in FIG. 11, comprises the air valve 117 (FIG. 14) that engages and depresses the air valve 117 on one of the stackable drive blocks 94-100 when the paddle 104 is mounted to a stackable drive block 94-100 as shown. It should be appreciated that each of the air valves 117 is normally closed, but becomes activated to the open position by a nipple or raised projection 104d when the paddle 104 is mounted on the stackable drive block 100.

Note in FIGS. 14A-14B, that the stackable drive block 100 and adjacent stackable drive block 98 have surfaces, such as the surfaces 100b and surfaces 98b in FIG. 11, respectively, that cooperate to define a generally rectangular aperture or area 111 (FIG. 11) that is sized and adapted to receive an end 104c1 of paddle 104. Once inserted in the area 111, the nipple or raised projection 104d urges or depresses the air valve 117 into an open position so that air can flow into stackable drive block 100 and the paddle 104 attached thereto and then inflate the air bag 106. Thus, once the paddles 104 are mounted onto one or more of the stackable drive blocks 94-100, the nipple or raised projection 104d depresses the air valve 117 to permit air to pass into and through the stackable drive blocks 94-100 and into any air bags 106 coupled thereto. Each paddle 104 comprises a paddle conduit 121a that receives air from the channel 100d and permits the air to pass into the inflatable air bag 106 attached to the paddle 104. This, in turn, causes the air bag 106 to inflate.

The air bag 106 may comprise the bag 107 (FIGS. 13, 14 and 14B) that is situated over the air bag 106 so that it can engage the at least one or a plurality of surfaces 12a on the turbine engine component or part 12 to be cleaned. In one embodiment, the air bag 106 is a rubber bladder or bag adapted to inflate and deflate. Notice in FIG. 11 that when the stackable drive block 100 is mounted on the stackable drive block 98, the conduit 100d becomes connected to and in fluid communication with an air conduit or passageway 98a of the stackable drive block 98. The air conduit or passageway 98a of the stackable drive block 98 is in fluid communication with the paddle conduit 121a so that air delivered through the air delivery shaft 112 passes into and through the stackable drive block 100, the conduit or channel 100d and into the passageway 98a of stackable drive block 98 so that air can be delivered to and inflate the air bag 106 coupled to the paddle 104 which is coupled to stackable drive block 98. As with the paddle 104 coupled to block 100, note that the paddle 104 also has the nipple or raised projection 104d that actuates or depresses the air valve 117 so that the passageway 98a becomes connected to and in fluid communication with the channel 100a of block 100. Although not shown, it should be understood that more or fewer passageways 100b, 98a may be provided in each of the stackable drive blocks 94-100, depending on the turbine engine component or part 12 to be cleaned.

For comparison, notice that the embodiment of FIGS. 8 and 9 illustrates the plurality of stackable drive blocks 94-100 stacked, with each having a plurality of paddles 104 coupled thereto and the conduit of each of the stackable drive blocks 94-100 in fluid communication so they can permit air to be delivered to the air bags 106 coupled to the paddles 104.

Once the turbine engine component or part 12 is positioned and all desired stackable drive blocks 94-100 are stacked and their respective desired paddles 104 are mounted thereto, the turbine engine component cleaning system and process 10 may be energized by activating the switch 34a (FIG. 4) on the switch box 34. The pneumatic air supply 119 supplies air to the air delivery shaft 112 which delivers the air into each of the stackable drive blocks 94-100, such as into the stackable drive block 100 and the stackable drive block 98 as shown. As shown in FIG. 7, the turbine engine component cleaning system and process 10 comprises the regulator valve 122 (FIG. 5) for controlling cubic feet per minute (CFM) of the airflow into the air delivery shaft 112. The air regulator valve 122 controls the PSI that the air bags 106 use to engage the surfaces 12a to be scrubbed, polished or cleaned.

For ease of illustration, the embodiment shown in FIGS. 10 and 11 only show two stackable drive blocks 98, 100 mounted onto the support block 92, but as previously mentioned, it should be understood that fewer or more stackable drive blocks 94-100 may be detachably stacked on top of each other and this will depend upon the turbine engine component or part 12 being cleaned. It should be appreciated that while each stackable drive block 94-100 is adapted to detachably receive at least one or a plurality of paddles 104, each of which have an inflatable air bag 106, it should also be understood that one or more of the stackable drive blocks 94-100 can be used without air bags 106 so that it is simply supporting an adjacent stackable drive block 94-100. For example, the stackable drive block 100 may have the paddle 104 detachably secured thereto, while an adjacent stackable drive block, such as stackable drive block 98 in FIG. 11, has either none or only a single paddle 104 secured thereto.

Notice in embodiments of FIGS. 8 and 9, a plurality of paddles 104 are mounted to each stackable drive block 94-100, while in the embodiment of FIG. 11, the stackable drive blocks 98 and 100 each only support a single paddle 104 and air bag 106. If a stackable drive block 94-100 has no paddle, then that the air delivery conduit in the stackable drive block 94-100 will only deliver air to a subsequent or adjacent stackable drive block 94-100 if it exists and to any inflatable air bag 106 coupled thereto. If no paddles 104 are coupled, then the normally-closed air valves 117 prevent air from leaking outside any of the stackable drive blocks 94-100. FIG. 14B illustrates an inlet end 106a coupled to the paddle 104 via a connector 121.

Referring now to FIGS. 10 and 11, further details of the pneumatic passages or conduits will now be described relative to the stackable drive blocks 98 and 100, with it being understood that the other stackable drive blocks 94 and 96 are substantially the same in design and configuration. Notice that the drive shaft extension 54a is coupled to the support block 92, which does not have any conduits, as described earlier herein. The first one, namely stackable drive block 98 of the plurality of stackable drive blocks 94-100, is mounted to the support block 92 as shown. The first stackable drive block 98 comprises the conduit or passageway 98a. The stackable drive block 98 also comprises the plug 115 that seals the passageway 98a and also provides access thereto. The air valve 117 mentioned earlier herein is seated in the passageway 98a of the stackable drive block 98 as illustrated.

Notice that the stackable drive block 98 comprises the wall or surface 98b that cooperates with an end wall 92a on support block 92 to define a generally U-shaped channel or area 125 that is adapted to receive the portion 104c of the paddle 104. As mentioned earlier, the paddle 104 comprise the paddle conduit 121a (FIG. 11) that becomes in fluid communication with the conduit or passageway 98a of the stackable drive block 98 to which it is attached when the paddle 104 is insertably and detachably mounted to their respective block, such as stackable drive block 98 or 100 in the example of FIG. 11. Thus, the paddle 104 associated with stackable drive block 98 comprises the paddle conduit 121a that is in direct fluid communication with both the conduit or passageway 98a and at least one of the plurality of air bags 106 attached thereto. As mentioned earlier, each paddle 104 comprises the nipple or raised portion 104d or portion 104c that depresses the air valve 117 that resides in the stackable drive block 98. When the paddle end 104c is inserted into the area 125, the nipple or raised projection 104d depresses and opens the air valve 117 which opens up the passageway 98a and causes it to be in fluid communication with the paddle conduit 121a of the paddle 104. Of course, it should be understood that when the air valve 117 is not depressed by the nipple or raised projection 104d on the paddle end or arm 104c because the paddle 104 is not mounted on stackable drive block 98, it remains closed, yet the stackable drive block 98 will still deliver air or permit air to pass through passageway 98a to any upstream or the downstream stackable drive blocks 94, 96 or 100.

Thus, it should be understood that the pneumatic conduits or passageways (for example, 98a and 100c in the embodiment of FIG. 11) in each of the stackable drive blocks 94-100 are in fluid communication when they are detachably stacked as shown. Each of the support block 92, the air delivery shaft 112, and the stackable drive blocks 94-100 may comprise at least one or a plurality of gaskets, O-rings or seals (not shown) that provide a seal between adjacent stackable drive blocks 94-100 and their respective conduits.

FIGS. 8, 8A-8C and 9 illustrate an embodiment showing a plurality of stackable drive blocks 94-100 with each stackable drive block 94-100 having a pair of the paddles 104 mounted thereon. The bag 107 mentioned earlier may be placed over both the paddle 104 and the air bag 106 so that when the air bag 106 is inflated, it forces the bag 107 against the surface or plurality of surfaces 12a to be cleaned. When the drive motor 52 is energized, it rotates the entire assembly of stackable drive blocks 98-100 and their associated paddles 104 and bags 107 inside the part 12 and against the plurality of surfaces 12a of the turbine engine component or part 12 after the air bags 106 are inflated, thereby scrubbing, cleaning and/or polishing the plurality of surfaces 12a of the turbine engine component or part 12 to be cleaned.

Figure 5:
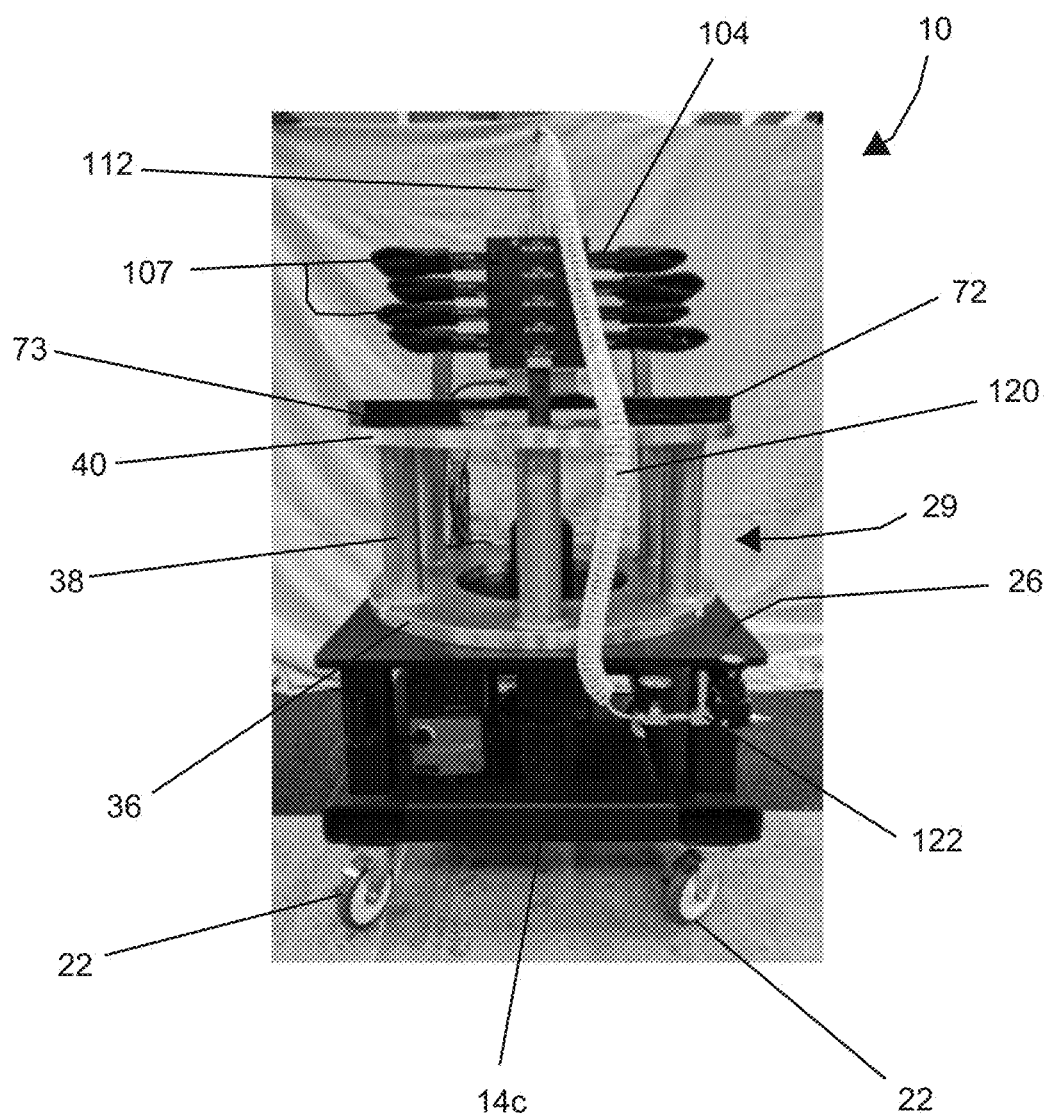
FIG. 5 is another front view of the embodiment shown in FIG. 1 illustrating an air or pneumatic hose coupling an air regulator to an air shaft that delivers air to at least one or a plurality of drive blocks.
Figure 6:
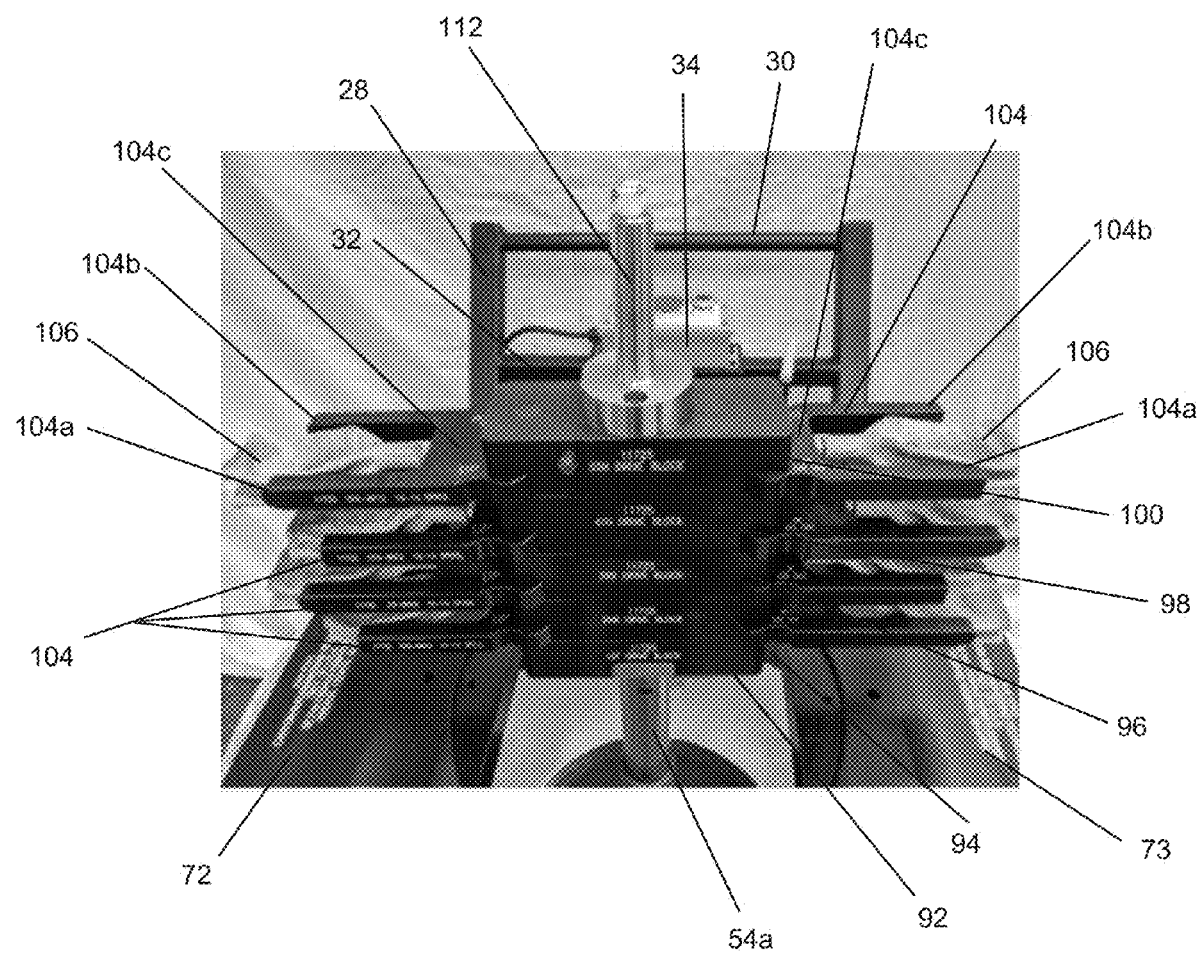
FIG. 6 is a view illustrating a plurality of drive blocks and having a plurality of paddles and air bags coupled thereto.

As alluded to earlier, one or more of the stackable drive blocks 94-100 may be provided as a support, but without any air bag 106 or paddle 104 coupled thereto. It should be understood that a single paddle 104 and air bag 106 may be used or a plurality of paddles 104 and air bags 106 may be used, and this will largely depend upon the plurality of surfaces 12a of the turbine engine component or part 12 to be cleaned. FIGS. 5, 10, 11, 14 and 14B illustrate bags 107 on each paddle 104 and FIGS. 6 and 8 show paddles with air bags connected, but without bags 107 placed on the paddles 104.

In one example, the turbine engine component or part 12 to be cleaned is a turbine engine coupling component that has the plurality of generally planar and cylindrical interior plurality of surfaces 12a that lie in planes that are generally radial to the axis A of rotation of the drive shaft 54. As mentioned earlier herein, although the plurality of surfaces to be cleaned 12a are generally planar, spaced, generally cylindrical and generally parallel, it should be appreciated that the plurality of surfaces 12a may be spaced, interior, exterior, generally parallel, non-parallel, radial, perpendicular, arcuate, interrupted, polygonal or the like, as illustrated schematically in FIG. 2B. It should also be understood that at least one of the surfaces to be cleaned may be spaced from another surface to be cleaned, interior to s turbine engine component or part 12, generally parallel to another surface to be cleaned, non-parallel to another surface to be cleaned, radial, perpendicular, arcuate, interrupted, polygonal or the like. In one example, the turbine engine component or part 12 comprises the plurality of generally opposing surfaces 12a illustrated in FIGS. 2B, 7 and 9 that are generally cylindrical and define at least one generally circular planar surface or plate that is interior to the housing 12b (FIG. 9) of the turbine engine component or part 12.

Notice in FIGS. 14 and 14A-14C and as described herein that the stackable drive blocks 94-100 nest on top of each other as shown. For ease of illustration, further features of two of the blocks, namely stackable drive blocks 98 and 100, will be shown and described relative to FIG. 14A, but it should be appreciated that these features reside in the other stackable drive blocks 94-96 as well. Notice in FIGS. 14A-14C that stackable drive block 98 comprises the generally rectangular internal aperture 101. The mating stackable drive block, stackable drive block 100 in the illustration, comprises a male projection 103 that is generally rectangular and mates with and complements the shape of the aperture 101 and is received in the aperture, and it defines the generally rectangular area 111. During use, it is important to note that the paddle 104 comprises the end 104c that is mounted on top of the stackable drive block 98 in the illustration. A pair of male projection locators 104e (FIGS. 14A and 14B) are adapted to be received in locating apertures 98f in stackable drive block 98 and in locating apertures 100f (FIG. 14A) in stackable drive block 100. After the paddle 104 is mounted on to the stackable drive block 98, the mating block 100 is mounted on top of the stackable drive block 98 and traps or secures the paddle end 104c between the stackable drive blocks 98 and 100 as illustrated.

Notice in FIGS. 14B-14G that the paddle 104 is adapted to receive the air bag 106 that comprises the connector 121 that couples the airbag to a paddle conduit 104g (FIG. 14C). The paddle conduit 104g becomes in fluid communication with the block conduit (conduit 98a in the example). The nipple or raised projection 104d cooperates and depresses the air valve 117 in order to couple the passageway 98a to the paddle conduit 121a. As described herein, once the paddle 104 is mounted to one of the stackable drive blocks 94-100, its conduit is also coupled and in fluid communication with the conduit of the block to which it is coupled, which also puts it in fluid communication with the conduits of other stackable drive blocks 94-100 used and also conduit 112b of the air delivery shaft 112 and ultimately the pneumatic air supply 119.

It should be understood that each of the drive blocks 94-100 have aligning and locking apertures, such as the aperture 98ƒ (FIG. 14A) on stackable drive block 98 that extends therethrough. After the stackable drive blocks 94-100 are mounted on top of each other and mated as described herein, the desired number of paddles 104 are mounted to one or more of the stackable drive blocks 94-100, the pair of bolts 93 (FIG. 14A) may be positioned and extend through all of the stackable drive blocks 94-100 and ultimately screwed into mating female threaded apertures (not shown) in the support block 92, thereby securing all of the stackable drive blocks and the paddles thereto.

As mentioned earlier, once the stackable drive blocks 94-100 are stacked, their conduits become in fluid communication and in fluid communication with the air delivery shaft 112 and ultimately the pneumatic air supply 119. Notice in FIG. 14 that the last block, namely stackable drive block 94, does not have a through aperture in the male projection 103 because it is mounted on the support block 92. In contrast, note that the stackable drive block 98 does have the passageway 98a. Because the stackable drive block 94 is supported directly by the support 92, it is the last stackable drive block that is adapted to supply air to any paddles 104 connected thereto because the support block 92 does not have any pneumatic apertures unlike the stackable drive blocks 94-100.

As described herein, after the turbine engine component or part 12 is mounted onto the support plate 26, the required number of support blocks of stackable drive blocks 94-100, the support block 92, air delivery shaft 112 and the like are all assembled to provide the pneumatic manifold assembly 59 inside the turbine engine component or part 12 and the paddles 104 positioned and mounted on the stackable drive blocks 94-100. The assembled stackable drive blocks 94-100, paddles 104, drive shaft extension 54a and the like are all then secured together and mounted onto the drive shaft 54 using the drive shaft extension 54a. After positioning of the turbine engine component or part 12 and assembly of the stackable drive blocks 94-100 and paddles 104 and the drive shaft extension 54a mounted onto the primary drive shaft 54, then the operator may start the turbine engine component cleaning system and process 10 which causes the drive motor 52 to rotate the entire manifold and support 92 and all the stackable drive blocks 94-100 so that the bags 107 on the paddles 104 can scrub, clean and/or polish the surfaces 12a in the manner described herein.

In the embodiment of FIGS. 14D-14E, the same parts are identified with the same part numbers, except that one or more prime mark(s) have been added to like part numbers for the different embodiment. FIG. 14D illustrates another embodiment of at least one paddle 104', except that this paddle 104' comprises a first hinge member 157' and a second hinge member 159' that are adapted to pivot about axis B (FIG. 14D) to allow insertion into the tight spaces of the turbine engine component or part 12', for example, by bending around a tight corner. Once inside the turbine engine component or part 12', it can be pivoted back into its original straight or planar configuration so that it acts like a normal paddle 104' depicted in the other embodiment.

As is illustrated in FIG. 14D, the paddle 104' comprises the first hinge member 157' and the second hinge member 159' are hingeably attached together with a pair of pivot pins 153' that permit the first and second hinge members 157' and 159' to pivot with respect to each other in the direction of double arrow B. Note that the paddle 104' comprises a pair of planar surfaces 155' that are generally opposed and that define a channel 158' through which the air bag 106' may pass after it has been coupled to the nozzle 121'. During use, it may be required that the paddle 104' be pivoted and then moved into a particular position and then unpivoted, for example, as illustrated in FIG. 14E. It has been found that the hingeable paddle 104' provides the ability to maneuver the paddle 104' into position inside the turbine engine component or part 12'.

FIG. 15 is a schematic illustration of a general procedure or process for cleaning the plurality of surfaces 12a of the turbine engine component or part 12. The procedure begins at block 150 where the user places and secures the turbine engine component or part 12 to be cleaned on the locators 72, 73. After the user positions the turbine engine component or part 12 onto the locators 72, 73 the user then secures, by conventional fasteners or bolts, the turbine engine component or part 12 onto the locators 72, 73.

After the turbine engine component or part 12 is secured, the routine continues to block 152 wherein a predetermined number of the stackable drive blocks 94-100 are stacked onto the support block 92. In this regard, the user stacks at least one or a plurality of the stackable drive blocks 94-100 onto the support block 92 in response to the number and position of the plurality of surfaces 12a to be cleaned. In this illustration, note that the turbine engine component or part 12 has pairs of generally parallel and opposing plurality of surfaces 12a as shown in FIG. 9. In the illustration being described, these surfaces are generally parallel, but as mentioned, they do not have to be or they could be spaced, interior, generally parallel, non-parallel, radial, perpendicular, arcuate, interrupted, polygonal or the like.

Thereafter, the routine continues to block 154 where a predetermined number of the paddles 104 are situated or detachably mounted to the stackable drive blocks 94-100. It should be understood that the paddles 104 may be detachably mounted onto the stackable drive blocks 94-100 prior to the stackable drive blocks 94-100 being stacked, but in the embodiment being described, the stackable drive blocks 94-100 are first stacked and then the paddles 104 and their associated air bags 106 and bags 107 are detachably mounted (block 156) to the stackable drive blocks 94-100 in response to the plurality of surfaces 12a to be cleaned. Once the paddles 104 are mounted onto the stackable drive blocks 94-100 and the stackable drive blocks 94-100 are stacked as illustrated, notice that the air bags 106 become positioned in generally opposed operative relationship with the plurality of surfaces 12a to be cleaned as illustrated in FIG. 9.

The operator then mounts the locking plate 80 (block 158) to the turbine engine component or part 12 using the fasteners 110. Note that a bearing assembly 127 on the locking plate 80 rotatably supports the air delivery shaft 112 during rotation and after the locking plate 80 is mounted onto the turbine engine component or part 12 as explained earlier. As mentioned earlier, notice that the turbine engine component or part 12 remains stationary as the stackable drive blocks 94-100 and their associated paddles 104 and the inflatable air bags 106 are rotated.

The routine continues to block 160 wherein the operator actuates the switch 34a to energize the turbine engine component cleaning system and process 10 and energizes drive motor 52 to rotate the pneumatic manifold assembly 59 inside the turbine engine component or part 12. Once the user turns the turbine engine component cleaning system and process 10 on, the pneumatic air supply 119 and drive motor 52 are energized and the air bags 106 become inflated. The various conduits from the pneumatic air supply 119 (e.g., 112b, 98a and 100a in FIG. 11) enable and cause the air to be delivered to the stackable drive blocks 94-100 and to any paddles 104 and air bags 106 secured thereto. The air regulator 122 controls the pneumatic air supply 119 and is adjustable so that the user may control the PSI delivered to the air bags 106. In one embodiment, the preferred air pressure supplied to the air bags 106 is about 2-5 PSI, but it could be higher or lower depending upon the air bag 106 itself. Before the turbine engine component cleaning system and process 10 is energized, however, the bags 107 are placed over the air bags 106 and paddles 104. Once inflated, the air bags 106 cause their associated bag 107 to engage at least one or a plurality of surfaces 12*a* to be cleaned with a predetermined amount of force. In general, the air bags 106 are inflated to about 2-3 PSI, but total force will be determined by the number of paddles 104, the type of air bags 106 used, as well as the desired contact pressure at which the air bags 106 engages the plurality of surfaces 12*a* to be cleaned. The operator then actuates the switch 34*a* which causes the motor to be energized, which in turn causes the paddles 104 and associated air bags 106 to rotate inside the turbine engine component or part 12 and on the plurality of surfaces 12*a* (block 162). In the illustration being described, the drive motor 52 drives the paddles 104 at approximately 15-20 RPMs and in one preferred embodiment, 17 RPMs. For example, notice in FIG. 9, that the plurality of surfaces 12*a* to be cleaned are generally opposing in one example. After the operator places the paddles 104 on the stackable drive blocks 98-100, the air bags 106 become situated in operative relationship with and between the plurality of surfaces 12*a* to be cleaned. When the air bags 106 are inflated, the air bags 106 force the bags 107 to engage both surfaces 12*a* so that when the drive motor 52 is energized, it causes each of the inflatable air bags 106 to engage and wipe, scrub and/or polish both surfaces 12*a* as the drive shaft 54 is rotated.

After cleaning, scrubbing and/or polishing, the plurality of surfaces 12*a*, the stackable drive blocks 94-100, paddles 104 and air bags 106 are disassembled (block 164). The locking plate 80 and air delivery shaft 112 are dismounted (block 166) from the turbine engine component or part 12 and stackable drive block 100. At decision block 168, it is determined if further processing of the turbine engine component or part 12 is needed or if the bags 107 need to be replaced. If further processing step(s) are needed or if the turbine engine component or part 12 needs to be cleaned again, then the routine continues to block 170 as shown. If no further processing is needed, then the processing is completed at block 168 and thereafter the routine ends.

In the illustration being described, the user causes the drive motor 52 to be energized for a predetermined amount of time necessary to clean the plurality of surfaces 12*a*. The predetermined amount of time will depend on the amount of cleaning required, the bags 107 being used, the amount of frictional force or PSI that the bags 107 engage the plurality of surfaces 12*a* to be cleaned, scrubbed or polished, which, in turn, results from the amount of fluid or air delivered to the inflatable air bags and the like. The PSI may be adjusted using the air regulator valve 122 (FIG. 5).

In general, the turbine engine component cleaning system and process 10 is energized for a predetermined amount of time as necessary to clean the plurality of surfaces 12*a* and in at least one embodiment, the predetermined time is less than about 30 minutes, and generally less than about 15 minutes. In contrast, it is important to note that the amount of time necessary to clean the same or a similar part in the prior art was on the order of about 3-5 hours.

In the illustration being described, the bags 107 are Scotch-Brite™ pads and are disposable or replaceable. It should be understood that a different abrasive material could also be a flexible cloth abrasive or any other flexible abrasive material.

Also, note in another embodiment of FIGS. 14F-14H that one or more permanent or detachable strips 107*a*' may be detachably secured, permanently secured or integrally formed with the bag 107' which covers air bag 106'. In this embodiment, the bag 107' has the strips 107*a*' that are detachably secured, permanently secured or integrally formed thereto. For example, note that the distal edge 107*b*' of the bag 107' has the added strips 107*a*' to reach areas where the air bag 106' is not able to pneumatically push a traditional bag 106 of the type shown and described earlier herein. The bag 107' with the strips 107*a*' facilitates cleaning, polishing or scrubbing areas, such as radii and corners of the engine component or part 12'. Again, the strips 107*a*' can be detachably secured, permanently secured or integrally formed with the bag 107' or separate or detachably secured thereto (e.g., with Velcro®, adhesive or the like) where necessary or desired, as illustrated in FIG. 14H. Note in FIG. 14H that the strips 107*a*' could extend beyond the boundaries of the bag 107'.

In some embodiments, it may be necessary to replace the bags 107 after every cleaning. In other embodiments and depending upon the amount of dirt or corrosion on the turbine engine component or part 12, it may be that the bags 107 can be used multiple times.

Advantageously, in one embodiment the turbine engine component cleaning system and process 10 is adapted to drive the paddles 104 at about 17 RPM, with an air bag 106 pressure of about 2-5 PSI. If desired, the paddles 104 may be driven at the same speed and pressure. Alternatively, they could be driven at a different speed, such as at intermittent speeds and utilizes a different pressure against the surfaces 12*a*.

Advantageously, another embodiment of this invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus and method herein described constitute preferred embodiments of this invention, it is to be understood that the invention is not limited to this precise system, apparatus and method, and that changes may be made therein without departing from the scope of the invention which is defined in the appended claims.

What is claimed is:

1. A turbine engine cleaner assembly for cleaning at least one turbine engine component, said turbine engine cleaner assembly comprising:

at least one drive block coupled to a driver for rotatably driving said at least one drive block, said at least one drive block comprising at least one passageway having an inlet and an outlet, said inlet coupled to a pneumatic supply; and a wiper comprising at least one paddle, said at least one paddle having at least one inflatable bad detachably mounted thereto, said at least one paddle adapted to be detachable mounted to said at least one drive block so that when air is received in said inlet, it passes into and through said at least one passageway and said outlet to inflate said at least one inflatable bag so that it engages at least one paddle so that said at least one paddle is rotatable driven and at least one cleaning area wipes, scrubs and/or polishes said at least one surface to be cleaned, wherein said at least one turbine engine component has said at least one surface to be cleaned, said turbine engine cleaner assembly being adapted to be removably mounted on said at least one drive block such that, after being mounted thereon, said turbine engine cleaner assembly becomes positioned in operative relationship with said at least one surface to be cleaned so that when said at least one drive block is energized, said turbine engine cleaner assembly rotates and wipes, scrubs and/or polishes said at least one surface to be cleaned.

2. The turbine engine cleaner assembly as recited in claim 1 wherein said at least one inflatable bag is adapted to be inflated to facilitate an engagement between said at least one cleaning area and said at least one surface to be cleaned so that when said at least one drive block is energized, said at least one drive block rotatably drives said wiper to wipe, scrub and/or polish said at least one surface to be cleaned.

3. The turbine engine cleaner assembly as recited in claim 1 wherein said at least one turbine engine component to be cleaned comprises a first surface and a second surface that is generally parallel to and opposes said first surface, said at least one cleaning area of said turbine engine cleaner assembly comprising at least one first cleaning area and at least one second cleaning area, said at least one first and second cleaning areas substantially simultaneously engaging said first surface and said second surface, respectively, so that when said driver rotatably drives said wiper, said first and second at least one cleaning areas of said wiper simultaneously rotate to wipe, scrub and/or polish said first and second at least one cleaning areas, respectively.

4. The turbine engine cleaner assembly as recited in claim 3 wherein said wiper comprises said at least one inflatable bag removably situated or mounted to said at least one paddle comprising said at least one first and second cleaning areas.

5. The turbine engine cleaner assembly as recited in claim 4 wherein said at least one inflatable bag is adapted to be inflated to increase a cross-sectional dimension to facilitate an engagement between said at least one first cleaning area and said first surface and said at least one second cleaning area and said second surface so that when said at least one drive block is rotated, said at least one inflatable bag is rotated to substantially simultaneously wipe, scrub and/or polish said first and second surfaces to be cleaned.

6. The turbine engine cleaner assembly as recited in claim 5 wherein when air is received in said inlet, it passes into and through said at least one passageway and said outlet to inflate said at least one inflatable bag so that when said at least one drive block drives said driver, said at least one cleaning area wipes, scrubs and/or polishes said at least one surface to be cleaned.

7. The turbine engine cleaner assembly as recited in claim 6 wherein said turbine engine cleaner assembly comprises a pneumatic control for controlling said pneumatic supply, said pneumatic control being adapted to vary a supply of air to said at least one inflatable bag in order to change a dimension of said at least one inflatable bag in order to vary a pressure of said at least one first and second cleaning areas to wipe, scrub and/or polish said at least one surface to be cleaned.

8. The turbine engine cleaner assembly as recited in claim 3 wherein said turbine engine cleaner assembly comprises a plurality of cleaners, each of said plurality of cleaners having at least one paddle having a wiper and being detachably mounted onto at least one of either said at least one drive block or another of said plurality of cleaners so that said wipers become positioned in operative relationship and engage a plurality of surfaces to be cleaned so that when said at least one drive block is rotated, said plurality of cleaners wipe, scrub and/or polish said plurality of surfaces to be cleaned, respectively.

9. The turbine engine cleaner assembly as recited in claim 8 wherein said wiper comprises at least one inflatable bag comprising said plurality of cleaning areas.

10. The turbine engine cleaner assembly as recited in claim 9 wherein said at least one inflatable bag is adapted to be inflated to increase a cross-sectional dimension of said at least one inflatable bag to facilitate an engagement between said at least one first cleaning area and said first surface and said at least one second cleaning area and said second surface so that when said at least one drive block is rotated, said at least one inflatable bag is rotated to substantially simultaneously wipe, scrub and/or polish said first and second surfaces to be cleaned.

11. The turbine engine cleaner assembly as recited in claim 10 wherein said first and second surfaces are generally planar and spaced a predetermined distance from each other; said cross-sectional dimension of said at least one inflatable bag being less than said predetermined distance when not inflated and being equal to or greater than said predetermined distance when inflated so that said at least one first cleaning area engages said first surface and said at least one second cleaning area engages said second surface so that when said at least one drive block is rotated, said at least one inflatable bag is rotated to substantially simultaneously wipe, scrub and/or polish said first and second surfaces to be cleaned.

12. The turbine engine cleaner assembly as recited in claim 1 wherein said at least one paddle has a hinge and can pivot about a predetermined axis.

13. The turbine engine cleaner assembly as recited in claim 1 wherein at least one inflatable bag comprises at least one of integrally formed strips or wipers or detachable strips or wipers that are detachably secured, permanently secured or integrally formed with said at least one inflatable bag in a predetermined position.

14. The turbine engine cleaner assembly as recited in claim 3 wherein said first and second surfaces to be cleaned are spaced, interior, generally parallel, radial, perpendicular, arcuate, interrupted, or polygonal.

15. The turbine engine cleaner assembly as recited in claim 1 wherein said at least one surface to be cleaned includes two surfaces to the cleaned, wherein the two surfaces to be cleaned are generally parallel and generally planar.

16. The turbine engine cleaner assembly as recited in claim 1 wherein said at least one surface to be cleaned is spaced from another surface to be cleaned, interior to said at least one turbine engine component, and is at least one of generally parallel to said surface to be cleaned, non-parallel to said another surface to be cleaned, radial, perpendicular, arcuate, interrupted, or polygonal.

* * * * *